(12) United States Patent
Murphy et al.

(10) Patent No.: US 10,450,084 B2
(45) Date of Patent: Oct. 22, 2019

(54) EMERGENCY LOCATOR TRANSMITTER ACTIVATION DEVICE FOR ENHANCED EMERGENCY LOCATION PERFORMANCE

(71) Applicant: The Boeing Company, Chicago, IL (US)

(72) Inventors: Timothy A. Murphy, Everett, WA (US); Charles O. Adler, Bellevue, WA (US); Fadl I. Khalil, Edmonds, WA (US)

(73) Assignee: The Boeing Company, Chicago, IL (US)

(*) Notice: Subject to any disclaimer, the term of this patent is extended or adjusted under 35 U.S.C. 154(b) by 365 days.

(21) Appl. No.: 15/053,982

(22) Filed: Feb. 25, 2016

(65) Prior Publication Data

US 2017/0248676 A1  Aug. 31, 2017

(51) Int. Cl.
| | | |
|---|---|---|
| G01S 1/00 | (2006.01) | |
| B64D 45/00 | (2006.01) | |
| G01S 19/17 | (2010.01) | |
| G01S 5/02 | (2010.01) | |
| G01S 1/68 | (2006.01) | |
| G01S 1/08 | (2006.01) | |

(52) U.S. Cl.
CPC ............ *B64D 45/00* (2013.01); *G01S 5/0231* (2013.01); *G01S 19/17* (2013.01); *B64D 2045/0065* (2013.01); *G01S 1/08* (2013.01); *G01S 1/68* (2013.01)

(58) Field of Classification Search
CPC . G01S 1/68; G01S 1/08; G01S 5/0231; G01S 19/17; B64D 45/00; B64D 2045/0065

USPC .............................. 342/385, 357.55; 340/981
See application file for complete search history.

(56) References Cited

U.S. PATENT DOCUMENTS

| | | | | | |
|---|---|---|---|---|---|
| 4,630,289 | A | * | 12/1986 | Wren | G08B 25/016 340/539.1 |
| 5,355,140 | A | * | 10/1994 | Slavin | G01S 5/0009 342/357.31 |
| 5,367,306 | A | | 11/1994 | Hollon et al. | |
| 5,394,142 | A | * | 2/1995 | Dusart | G01S 1/68 280/735 |
| 6,208,269 | B1 | | 2/2001 | Brodie et al. | |
| 6,324,393 | B1 | * | 11/2001 | Doshay | G01C 21/26 340/436 |

(Continued)

OTHER PUBLICATIONS

U.S. Appl. No. 61/337,731, filed Feb. 9, 2010.

(Continued)

*Primary Examiner* — Chuong P Nguyen
(74) *Attorney, Agent, or Firm* — Ostrager Chong Flaherty & Broitman P.C.

(57) ABSTRACT

An aircraft avionics unit that enhances the emergency location capability of existing Emergency Locator Transmitters (ELTs). This aircraft avionics unit can be integrated with a wide range of existing ELTs and their existing aircraft interfaces by changes to a small number of the signal wires between the ELT and the aircraft systems and the addition of limited inputs from aircraft systems. This system requires no changes to either the current ELTs or the associated aircraft systems. The integrated system maintains the current ELT concept of operations while providing significantly enhanced ELT activation triggering with a low-impact, low-cost approach.

16 Claims, 18 Drawing Sheets

(56) References Cited

U.S. PATENT DOCUMENTS

| | | | | |
|---|---|---|---|---|
| 6,992,623 | B2* | 1/2006 | Street | G01S 5/0226 342/385 |
| 7,916,084 | B2* | 3/2011 | Dutruc | H01Q 21/28 340/945 |
| 8,154,444 | B1* | 4/2012 | Edward | G01S 19/17 342/357.55 |
| 8,687,375 | B2* | 4/2014 | Uy | G01S 5/0231 361/754 |
| 8,727,263 | B2 | 5/2014 | Fabre et al. | |
| 9,193,478 | B2 | 11/2015 | Girod et al. | |
| 9,452,844 | B1* | 9/2016 | Ye | B64D 3/00 |
| 9,562,963 | B2* | 2/2017 | Colin | G01C 21/20 |
| 9,632,181 | B2* | 4/2017 | Karayil Thekkoott | G01S 19/03 |
| 9,745,071 | B1* | 8/2017 | Wang | B64D 45/00 |
| 9,771,160 | B2* | 9/2017 | Ye | B64D 3/00 |
| 10,002,519 | B2* | 6/2018 | Bekanich | G08B 25/006 |
| 10,075,228 | B2* | 9/2018 | Klippert | H04W 4/046 |
| 2010/0194622 | A1 | 8/2010 | Clingman et al. | |
| 2011/0194629 | A1 | 8/2011 | Bekanic | |
| 2013/0070556 | A1 | 3/2013 | Huskamp et al. | |
| 2014/0049393 | A1* | 2/2014 | Boyt | G08B 25/006 340/540 |
| 2016/0047880 | A1* | 2/2016 | Helfrick | G01S 5/0231 340/981 |
| 2016/0176538 | A1 | 6/2016 | Bekanic | |
| 2017/0106997 | A1* | 4/2017 | Bekanich | G08B 25/006 |
| 2017/0155763 | A1* | 6/2017 | Bekanich | H04M 3/42382 |
| 2017/0247118 | A1* | 8/2017 | Adler | B64D 45/00 |
| 2017/0248701 | A1* | 8/2017 | Adler | G01S 19/17 |
| 2018/0032042 | A1* | 2/2018 | Turpin | G05B 21/02 |
| 2018/0240324 | A1 | 8/2018 | Bekanic | |
| 2018/0247519 | A1 | 8/2018 | Bekanic | |

OTHER PUBLICATIONS

U.S. Appl. No. 61/339,863, filed Mar. 10, 2010.
U.S. Appl. No. 61/632,883, filed Feb. 1, 2012.
U.S. Appl. No. 13/694,660, filed Dec. 26, 2012.

* cited by examiner

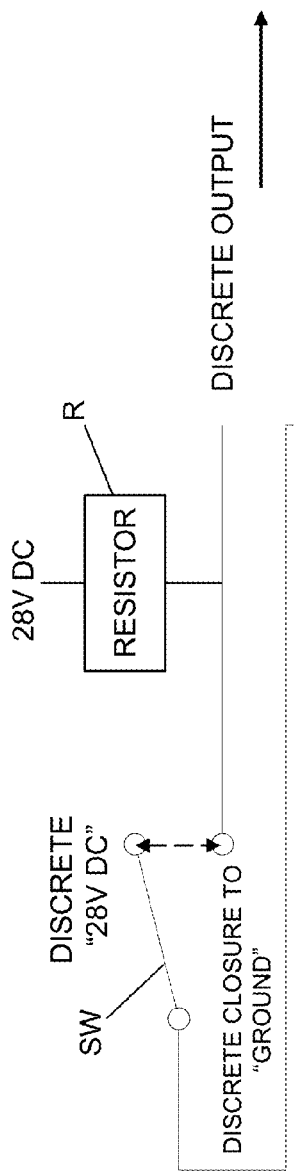
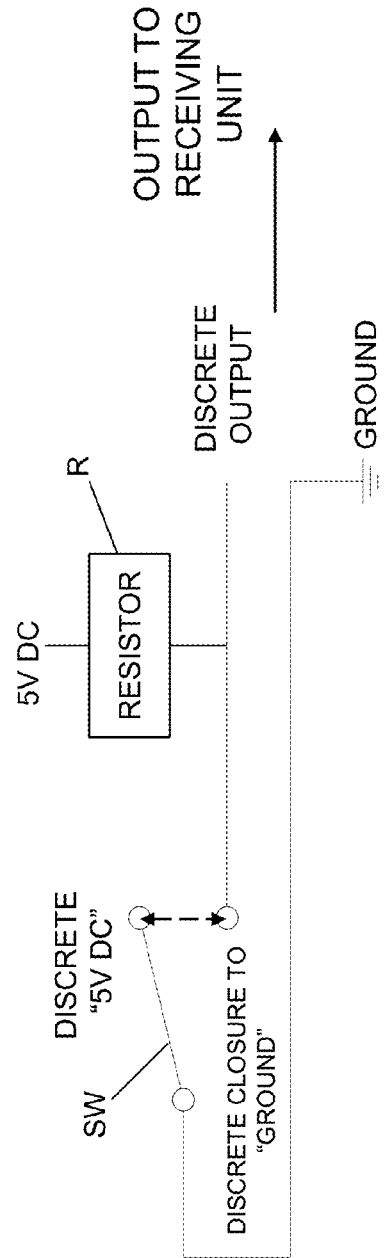
FIG. 8A
FIG. 8B

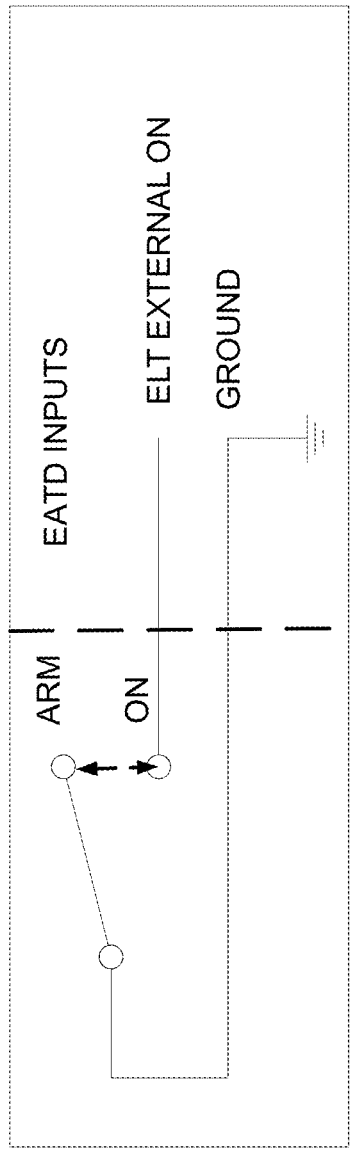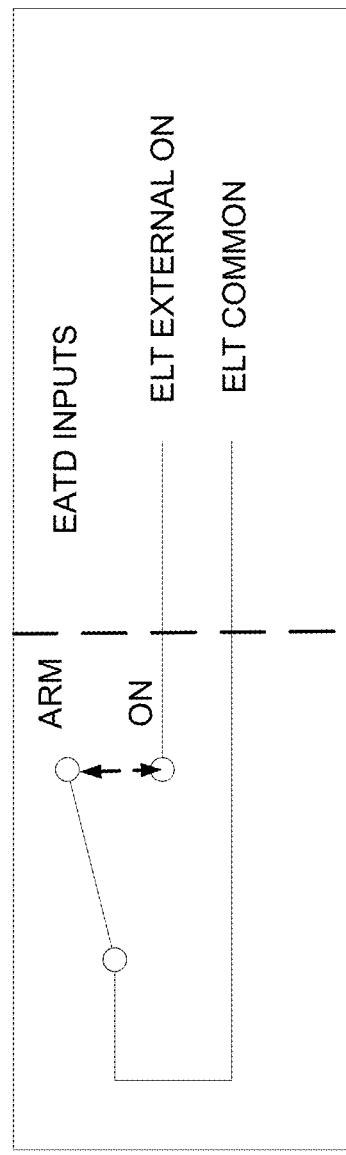

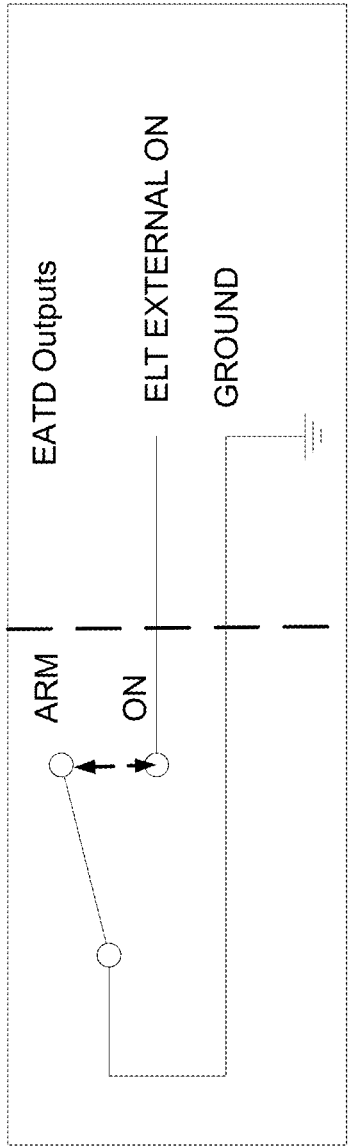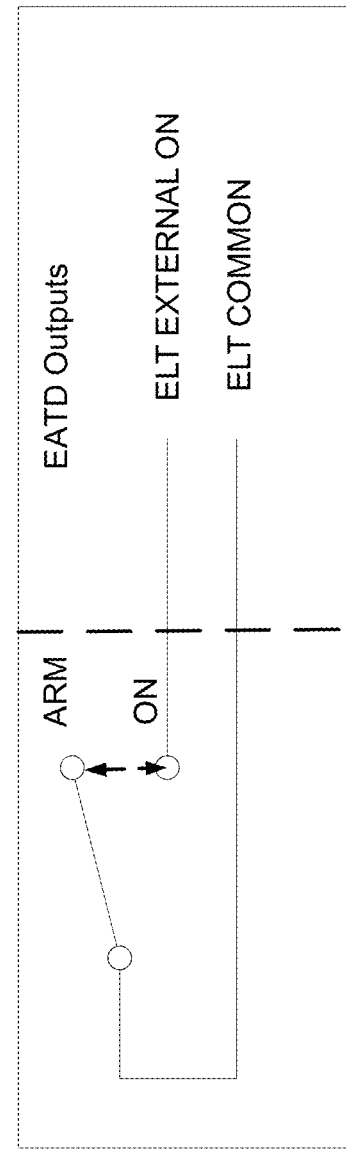
FIG. 11A
FIG. 11B

EMERGENCY LOCATOR TRANSMITTER ACTIVATION DEVICE FOR ENHANCED EMERGENCY LOCATION PERFORMANCE

BACKGROUND

The technology disclosed herein generally relates to systems and methods for detecting and locating an aircraft in distress. More particularly, the technology disclosed herein relates to integrated aircraft distress system architectures capable of providing emergency location functionality.

Most commercial airliners are equipped with fixed Emergency Locator Transmitters (ELTs) that broadcast beacons and satellite uplinks in the case of an emergency to enable search and rescue crews to find the aircraft. Current ELT units are significantly limited in locating crash sites due to their basic concept of operations of activating after a crash has occurred. There are similar proposals for enhanced ELTs with pre-crash triggering capability, but these involve new ELTs and significant aircraft impacts and are likely to take a considerable period of time to develop and deploy and will probably entail significant installation and integration costs.

The foregoing shortcomings can be addressed by providing low-impact, low-cost approaches for enhanced pre-crash activation using current ELTs and emergency detection infrastructure with enhancements to facilitate earlier and wide adoption of improved emergency location capabilities.

SUMMARY

The subject matter disclosed in detail below is directed to an aircraft avionics unit that enhances existing ELT emergency location capability. This aircraft avionics unit can be integrated with a wide range of existing ELTs and their existing aircraft interfaces by changes to a small number of the signal wires between the ELT and the aircraft systems and the addition of limited inputs from aircraft systems. This system requires no changes to either the current ELTs or the associated aircraft systems. The integrated system maintains the current ELT concept of operations while providing significantly enhanced ELT activation triggering with a low-impact, low-cost approach.

As used herein, "triggering" is an event that precedes "activation" of the ELT. In the embodiments disclosed in detail below, trigger logic determines when to output a request for ELT activation to activation logic, and then the activation logic determines whether to output an activation command to the ELT or not. The term "ELT activation/trigger device" (EATD) as used herein means a device that triggers an activation request based on some factors and then determines whether an activation command should be sent in response to receipt of the activation request based on other factors.

The low-impact ELT activation/trigger devices (EATDs) disclosed herein provide multiple improvements over current ELT-only configurations, including enhanced pre-crash, aircraft behavior-based ELT triggering to significantly enhance emergency location performance through both earlier activation and the associated longer duration broadcasts. The methods disclosed herein require no changes to existing crew interfaces or ELT use crew concept of operations, has very low installation impacts and costs, has no impact to crew training and crew workload in an emergency.

One aspect of the subject matter disclosed in detail below is a method for enhancing an emergency locator transmitter system on an aircraft, the emergency locator transmitter (ELT) system comprising an antenna, an emergency locator transmitter having a radio frequency signal port connected to the antenna, and an ELT remote panel that has a manually operable switch, the method comprising: (a) connecting the switch of the ELT remote panel to a first input data port of an activation/trigger device by wiring; and (b) connecting a first output data port of the activation/trigger device to an input data port of the emergency locator transmitter by wiring. In accordance with some embodiments: step (a) comprises connecting the first input data port of the activation/trigger device to wiring that connects the switch of the ELT remote panel to the input data port of the emergency locator transmitter, and step (b) comprises connecting the first output data port of the activation/trigger device to the wiring that connects the switch of the ELT remote panel to the input data port of the emergency locator transmitter.

The method described in the preceding paragraph may further comprise connecting a second input data port of the activation/trigger device to receive inputs from an output data port of an aircraft avionics system, wherein the inputs from the output data port of the aircraft avionics system comprise aircraft discrete inputs and aircraft navigation inputs.

In accordance with the embodiments disclosed herein, the activation/trigger device is configured with activation logic that determines whether, based on inputs from aircraft avionics systems and ELT crew activation inputs from the switch of the ELT remote panel, an ELT activation signal should be sent to the emergency locator transmitter or not.

Another aspect of the subject matter disclosed in detail below is a system onboard an aircraft comprising: an ELT remote panel on the flight deck of the aircraft, the ELT remote panel comprising a switch; an antenna that is attached to an exterior of a fuselage skin of the aircraft; an emergency locator transmitter connected to the antenna; and an activation/trigger device connected to the switch of the ELT remote panel and to the emergency locator transmitter. The emergency locator transmitter may also be connected to the switch of the ELT remote panel.

In accordance with some embodiments, the system further comprises an aircraft avionics system connected to the activation/trigger device. The activation/trigger device is configured with activation logic that determines whether, based at least in part on inputs from the aircraft avionics system and ELT crew activation inputs from the switch of the ELT remote panel, an ELT activation signal should be sent to the emergency locator transmitter or not.

A further aspect of the subject matter disclosed in detail below is a system onboard an aircraft comprising: a manually operable switch incorporated in a flight deck panel; an antenna that is attached to an exterior of a fuselage skin of the aircraft; an emergency locator transmitter having a radio frequency signal port connected to the antenna; and an activation/trigger device connected to the switch of the ELT remote panel by wiring and connected to the emergency locator transmitter by wiring.

Yet another aspect of the subject matter disclosed in detail below is an emergency locator transmitter (ELT) activation/trigger device comprising: first processing means comprising ELT activation logic; and an input interface comprising first, second and third terminals and second processing means configured to output an ELT ON state signal to the ELT activation logic if an impedance between the first and third terminals is effectively zero or if an impedance between the first and second terminals is effectively zero. In accordance with some embodiments, the input interface further comprises: a high-impedance buffer circuit connected to the first, second and third terminals; and an analog-to-digital converter between the high-impedance buffer circuit and the second processing means. The first processing means may further comprise an aircraft behavior state estimator and trigger logic that receives an estimated aircraft behavior state signal from the aircraft behavior state estimator and the ELT ON state signal from the second processing means, and is configured to send an ELT activation request signal to the ELT activation logic if the estimated aircraft behavior state signal indicates an abnormal or distress state or an ELT ON state signal has been received.

Other aspects of systems and methods for location tracking of aircraft in distress using an ELT unit are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

FIGS. 8A through 8D are diagrams showing different switch configurations for outputting discretes: a 28-V discrete (FIG. 8A); a 5-V discrete (FIG. 8B); an Open/Ground discrete (FIG. 8C); and an Open/Closed discrete (FIG. 8D).

FIGS. 10A and 10B are diagrams depicting the internal wiring of a flight deck panel switch in accordance with respective ELT remote panel switch configurations.

FIGS. 11A and 11B are diagrams showing respective ELT activation output configurations that support various possible ELT configurations.

In FIGS. 1, 3, 4 and 15, the following symbology has been adopted: any line connecting two components and having no arrowhead represents aircraft wiring for carrying RF electrical signals (e.g., RF coaxial cable); any line connecting two components and having at least one arrowhead represents aircraft wiring for power or data; any dashed arrow represents an RF signal path; and any zigzag-shaped arrow represents RF signals propagating through the atmosphere.

Reference will hereinafter be made to the drawings in which similar elements in different drawings bear the same reference numerals.

DETAILED DESCRIPTION

Illustrative embodiments of an aircraft-in-distress location tracking system are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The embodiments disclosed below utilize existing aircraft information systems and existing aircraft power systems. These existing aircraft systems will vary in their specifics depending on the aircraft model and avionics architectures used. For the purposes of the current disclosure, virtually all will support the interfaces described, although the specific location/sourcing unit may vary.

The existing fixed ELT system (that is being enhanced by and integrated within the configurations disclosed below) comprises an ELT, of which there are multiple variations from multiple manufacturers. The interfaces described in this disclosure are common across those used by many (probably most or all) commercial airliners. The existing fixed ELT system further comprises an externally mounted ELT antenna and a flight deck-mounted ELT switch. This switch can vary by aircraft and ELT model. The interface architecture described herein enables the various architectures disclosed herein by supporting the ELT switch interfaces for many (probably most or all) commercial airliners and ELTs.

The ELTs as currently implemented on aircraft have many important features, including direct crew activation panels, aircraft identification information for transmissions, locator beacons that rescue aircraft or ground rescuers can use to locate a crash site, and the ability to uplink satellite transmissions to the international worldwide coverage COSPAS/SARSAT. COSPAS/SARSAT is a search and rescue satellite system that allows location of persons in distress by means of the signals received via the space elements (including the inclusion of aircraft location in the satellite uplink for newer systems). The system serves a wide variety of users including those on ships, aircraft and travelers in remote regions.

Figure 1:
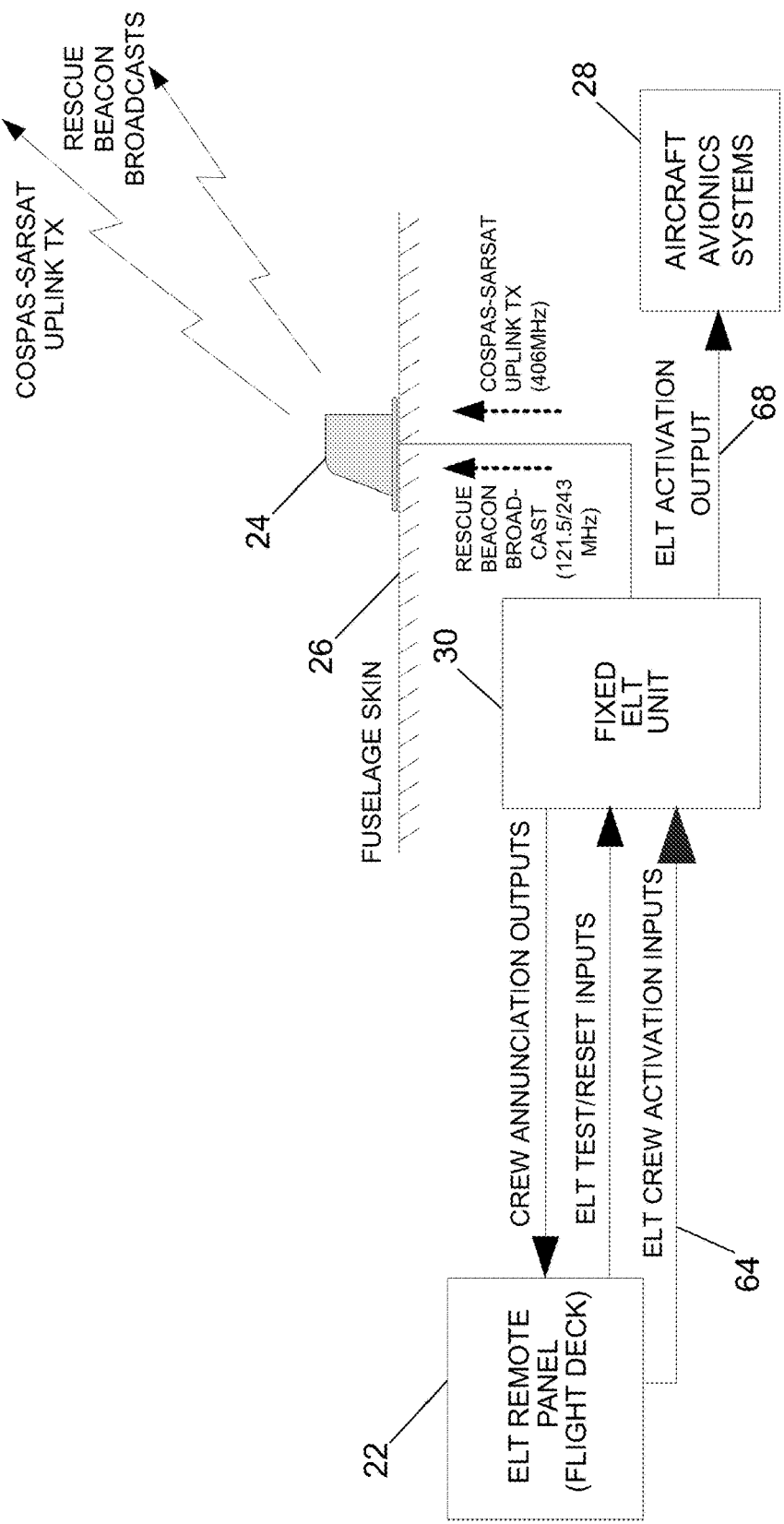
FIG. 1 is a diagram showing a typical stand-alone ELT architecture.

ELTs are fairly broadly used within the airline industry with some models of wide-body aircraft approaching 100% equipage with ELTs. There are many models and manufacturers of ELTs, all built to common standards but with varying flight deck interfaces and concepts of operations. A typical stand-alone ELT installation is shown in FIG. 1. This installation comprises a fixed ELT unit 30, an ELT antenna 24 mounted on an external surface of a fuselage skin 26, and an ELT remote panel 22 on the flight deck, which remote panel comprises the aforementioned ELT switch which can be manually operated by a member of the flight crew. The main transmitter control switch is labeled "ON"—"ARM". The switch is in the armed position for normal operations. The ELT remote panel 22 also has input means for sending ELT test/reset inputs to the ELT unit 30 and means for annunciating the state of the ELT unit 30 in response to crew annunciation outputs received from the ELT unit 30. The ELT unit 30 can be triggered by ELT activation inputs 64 from the ELT remote panel 22 and/or activation inputs from sensors (not shown in FIG. 1, but see FIG. 2) internal to the ELT unit 30 that detect the impact force produced during a crash. In response to a trigger event, the ELT unit 30 outputs electrical signals to the ELT antenna 24, which cause the latter to broadcast a 406-MHz rescue beacon to the COSPAS/SARSAT rescue satellite system. The rescue beacon transmits bursts of digital information to orbiting satellites, and also contains a small integrated analog (121.5/243 MHz) homing beacon. Advanced beacons encode a GPS or GLONASS position into the signal. The fixed ELT unit 30 also sends an ELT activation output 68 (indicating that the ELT unit 30 has been activated) to the aircraft avionics systems 28.

Figure 2:
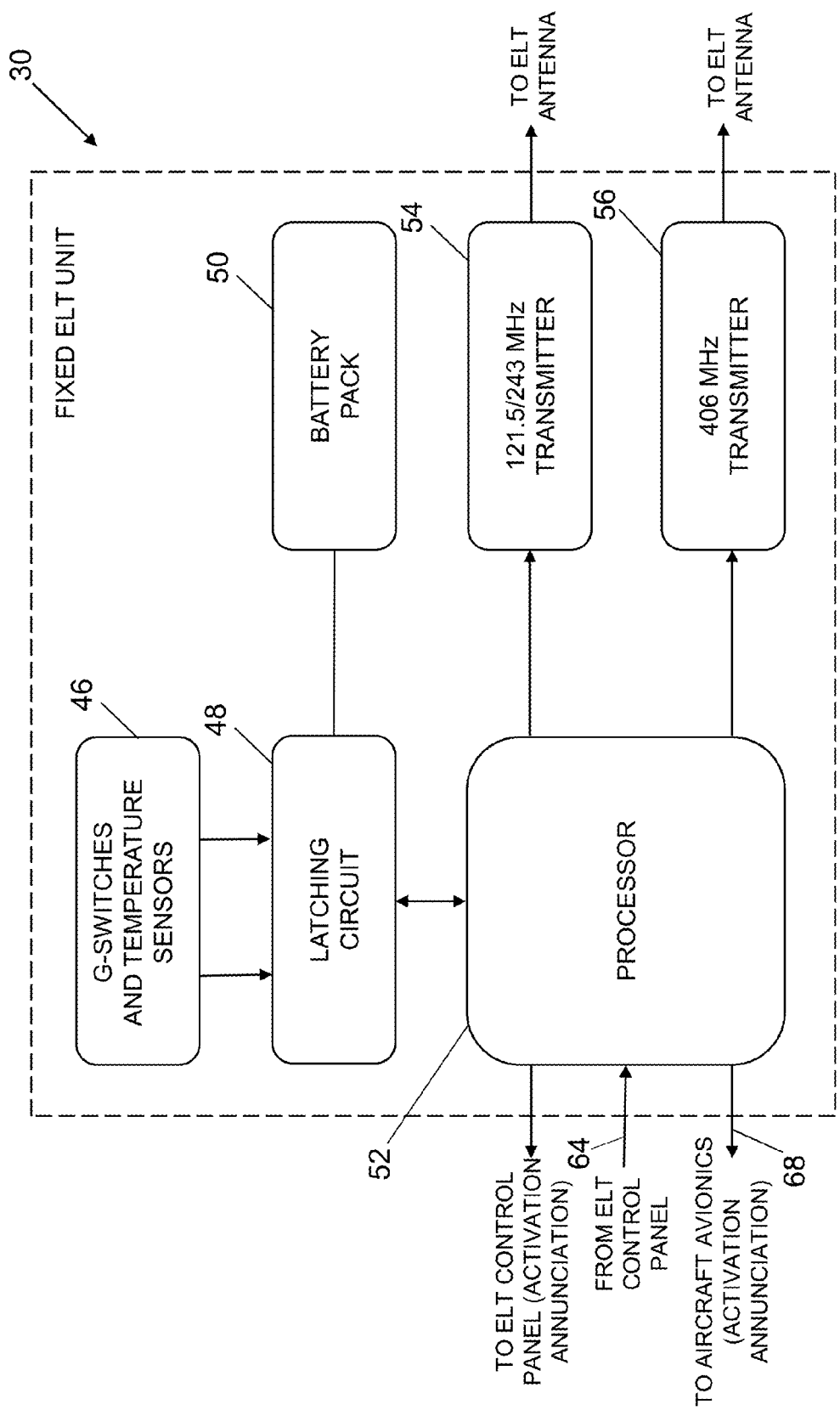
FIG. 2 is a block diagram identifying some major components and interfaces of a typical ELT.

FIG. 2 identifies some components of a typical ELT unit 30. In the embodiment depicted in FIG. 2, the internal sensors 46 include G-switches that detect high accelerations/decelerations indicative of a crash impact for multiple axes and high-temperature switches that detect temperatures associated with a fire. The states of the internal switches 46 are stored in a latching circuit 48, which is powered by a battery pack 50. All functions of the ELT unit 30 are under the control of a microprocessor 52, which receives electrical power from the battery pack 50 via the latching circuit 48. In the event of a crash, the microprocessor 52 activates the transmitter 54 to transmit the standard swept tone on 121.5 MHz, lasting until battery power is exhausted. This 121.5-MHz signal is mainly used to pinpoint the beacon during search and rescue operations. In addition, for the first 24 hours of operation, the microprocessor periodically activates the transmitter 56 to transmit a 406-MHz signal, e.g., at 50-second intervals. This transmission contains identification data programmed into the beacon, which is received by the COSPAS-SARSAT satellites. The transmitted data is referenced in a database (maintained by the national authority responsible for ELT registration) and used to identify the beacon and owner.

The ELT activation methods have a number of significant issues, the primary one of which is a limited success rate in locating major crashes. These limitations arise primarily due to the activation methods, i.e., the internal sensors activate upon a crash event with sufficient decelerations/accelerations. The issues from this primary ELT concept of operations include:

1) Crash impacts that do not have sufficient decelerations to trigger the ELT. These may occur because of lower speeds, impact attitudes etc.

2) Failure of the flight crew to activate the ELT. This may be due to the flight crew being fully engaged with aircraft recovery attempts or it may be due to flight crew members intentionally not activating location equipment.

3) Crash impacts that take place with aircraft attitudes that interfere with transmissions. For example, an aircraft that impacts while inverted would place the ELT system in a position where its transmissions could not be uplinked.

4) Crash impacts which disable the ELT system (e.g., shearing off the ELT antenna before the location can be uplinked or determined) or which block ELT transmissions (e.g., where the antenna is immersed in water).

5) A final concept of operations-based limitation is that ELTs must rely on large internal batteries for power since the crash forces that may activate them may also disable aircraft power sources. These internal batteries can be a source of issues as well and there is significant interest in reducing or doing away with these batteries.

The standards for a second generation of ELTs are in process. The requirements in this developing standard address the aforementioned issue of limited success rate in crash location by focusing on fusing extensive internal aircraft state information, such as the status of the aircraft engines, with aircraft trajectory and attitude information to provide new, high-assurance trigger inputs to the second-generation ELTs to activate the emergency transmissions upon indications that a crash is probable.

This second-generation ELT approach has a number of drawbacks for implementation, including requiring fairly extensive use of a diverse set of aircraft avionics data inputs and trigger algorithm implementation in already highly integrated and tightly regulated avionics components. These implementation issues, while intended to support addressing the technical issues with current ELTs, will impose significant operational costs. In particular they will require extensive development and certification time and costs that will need to be replicated for multiple aircraft/avionics architectures and they will have significant installation costs that will probably result in significant impacts on airline uptake and uptake timing for implementing these capabilities in their operational aircraft.

In accordance with system level implementation alternative proposed herein, interface functions, ELT activation logic, distress trigger logic and aircraft behavior estimator logic (to be described in detail below) are implemented as a standalone ELT activation/trigger device (EATD). This device would not have SATCOM link capabilities, but could have a GNSS receiver and antenna or could be implemented using existing navigation sources on the aircraft.

The primary benefit of this approach would be to provide enhanced emergency location by providing earlier (pre-crash) ELT triggering and longer pre-crash ELT transmission durations. This alternative would provide a significant amount of the second-generation ELT functionality using current-generation ELTs and their current installations. This would provide a potentially moderate-cost, low-installation-impact, nearer-term implementation prior to the full second-generation ELT roll-out.

Figure 3:
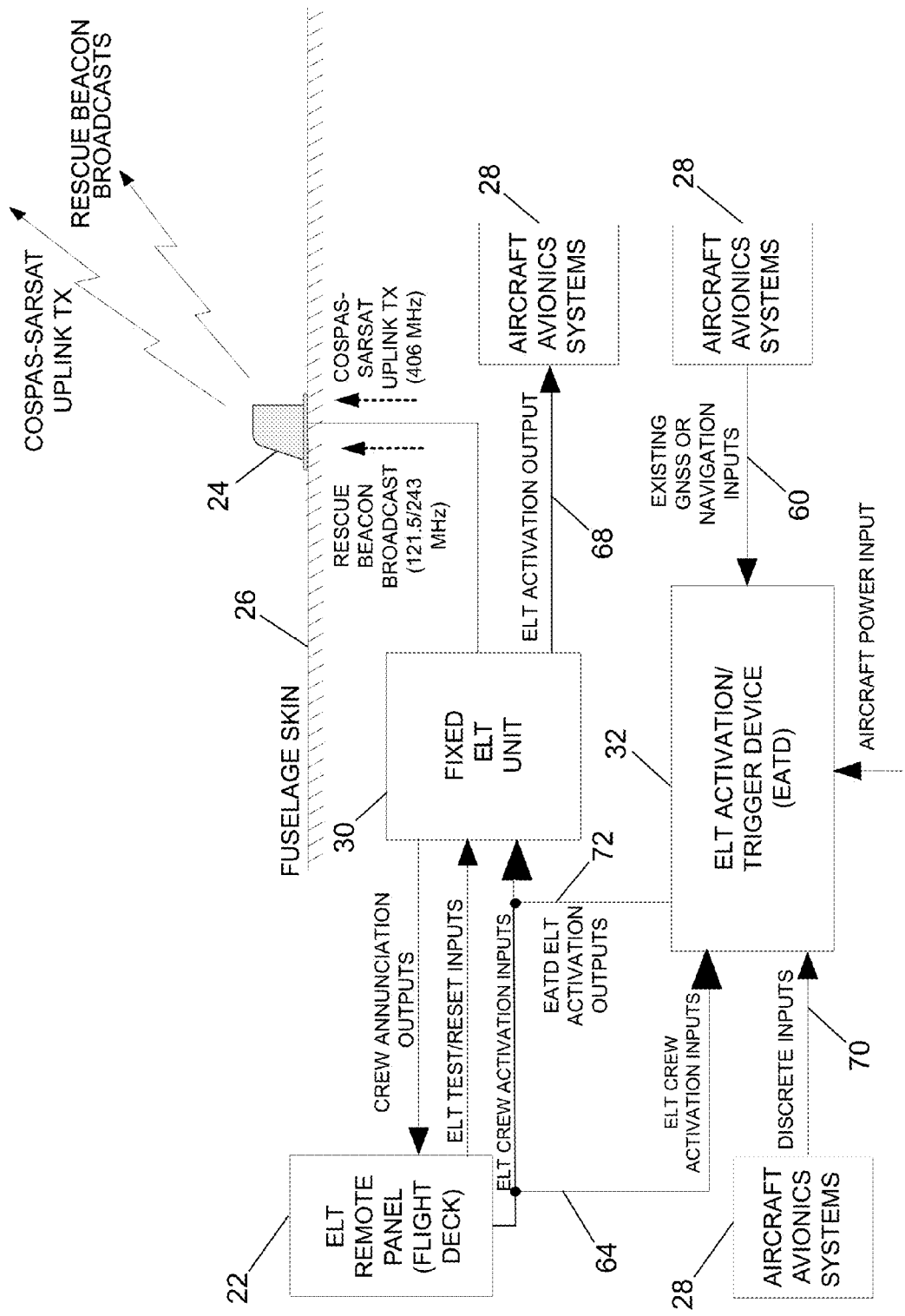
FIG. 3 is a diagram showing a parallel EATD-ELT integrated architecture configuration in accordance with one embodiment.

An EATD and ELT system parallel configuration in accordance with one embodiment is shown in FIG. 3. This installation comprises a fixed ELT unit 30, an ELT antenna 24 mounted on an external surface of a fuselage skin 26, and an ELT remote panel 22 on the flight deck, which remote panel comprises the aforementioned ELT switch which can be manually operated by a member of the flight crew. As previously mentioned, the main transmitter control switch is labeled "ON"—"ARM". The transmitter is in the armed position for normal operations. The ELT remote panel 22 also has input means for sending ELT test/reset inputs to the ELT unit 30 and means for annunciating the state of the ELT unit 30 in response to crew annunciation outputs received from the ELT unit 30. The ELT unit 30 can be triggered by ELT activation inputs 64 from the ELT remote panel 22 and/or activation inputs from sensors (not shown in FIG. 3, but see FIG. 2) internal to the ELT unit 30 that detect the impact force produced during a crash. In response to a trigger event, the ELT unit 30 outputs electrical signals to the ELT antenna 24, which cause the latter to broadcast a 406-MHz rescue beacon to the COSPAS/SARSAT rescue satellite system as previously described. The fixed ELT unit 30 also sends an ELT activation output 68 (indicating that the ELT unit 30 has been activated) to the aircraft avionics systems 28.

The installation shown in FIG. 3 further comprises an EATD 32 connected to receive discrete inputs 70 from the aircraft avionics systems 28. The EATD 32 can be triggered to transmit EATD ELT activation outputs 72 to the ELT unit 30 based on the ELT crew activation inputs 64 from the ELT remote panel 22 and the discrete inputs 70 from the aircraft avionics systems 28. The EATD 32 also receives existing GNSS or navigation inputs 60 from the aircraft avionics systems 28.

The EATD system disclosed herein is intended to support broad retrofit applicability for aircraft. To facilitate retrofitting, the EATD 32 may be in the form of a line replaceable unit (LRU) located within the fuselage pressure vessel. The EATD 32 may be either a crown-mounted unit or a lower lobe rack-mounted unit. For both the crown mount and the lower lobe rack mount options, the EATD 32 will be typically installed in the aft fuselage (aft of the wing rear spar and forward of the aft pressure bulkhead). The EATD 32 should be mounted on secondary (not primary) aircraft structure.

A key feature for the EATD ELT activation output illustrated in FIG. 3 is that it is coupled into the existing ELT remote panel switch-to-ELT unit control path by an OR circuit (not shown), meaning that either the manually operated switch on the ELT remote panel 22 or the EATD 32 can activate the ELT unit 30 independently of each other. This allows the activation of the ELT unit 30 either in response to flight deck ELT activation inputs 64 per the existing concept of operations or in response to EATD ELT activation outputs 72 from the EATD 32 triggered by the latter's own trigger determination logic. Using this "OR" connection allows the EATD 32 to apply advanced triggering capabilities to existing ELTs with no changes to the ELTs and very minor changes to the existing ELT wiring (and no ELT installation changes). This "OR" configuration reduces the certification risk since the existing ELT remote panel switch-to-ELT unit control path is maintained intact.

Figure 4:
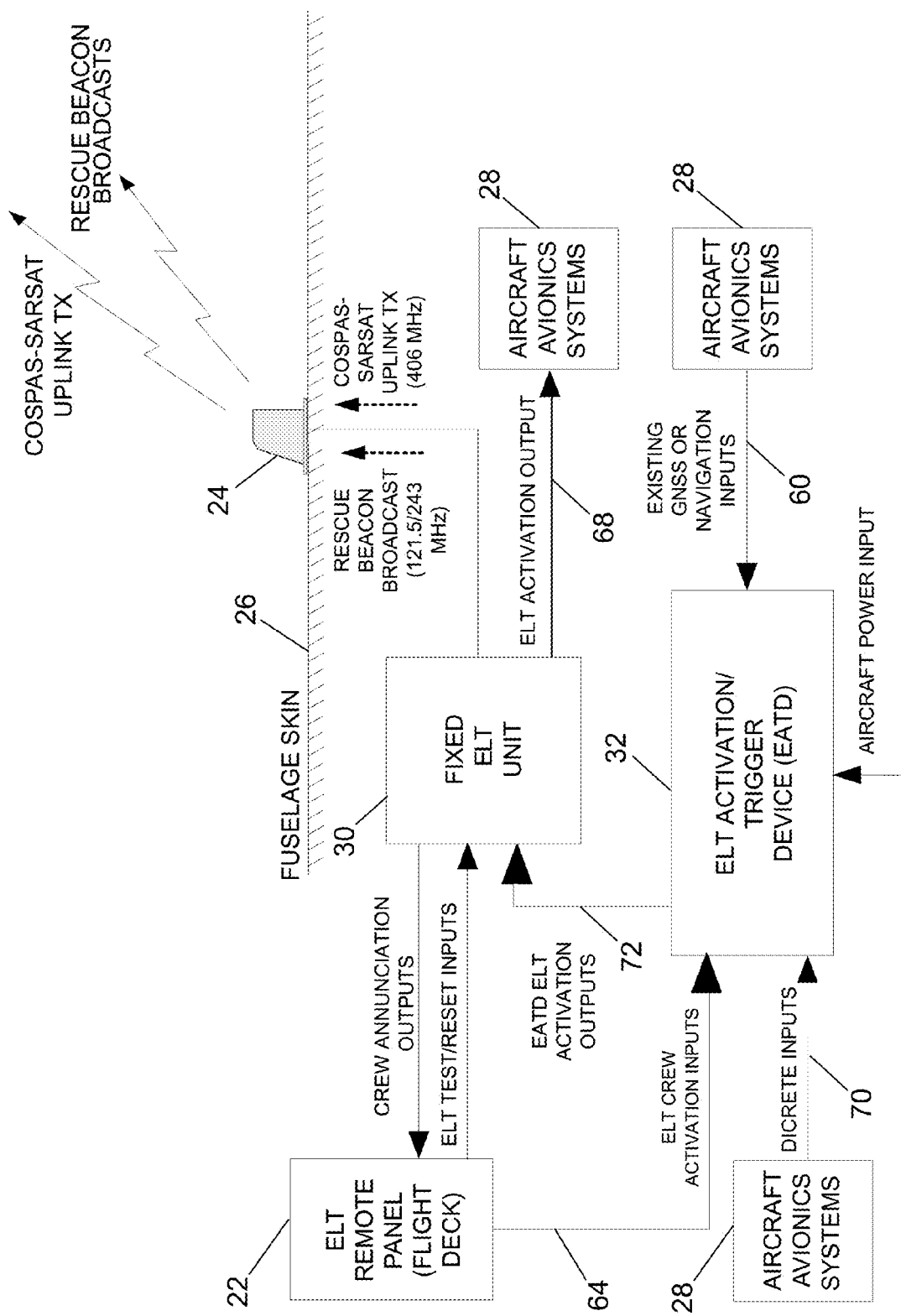
FIG. 4 is a diagram showing a series EATD-ELT integrated architecture configuration in accordance with another embodiment.

FIG. 4 is a diagram showing a series EATD-ELT integrated architecture configuration in accordance with another embodiment. The major difference from the parallel configuration shown in FIG. 3 is that the EATD 32 is now placed in series between the ELT remote panel 22 and the ELT unit 30. Thus the EATD 32 (not the ELT unit 30) receives the ELT activation input 64 as shown in FIG. 4. This feature allows the EATD 32 to control the activation of the ELT unit 30 by sending EATD ELT activation outputs 72 to the ELT unit 30. The conventional flight deck activation concept of operations of the ELT unit 30 is still supported by pass-through logic in the EATD 32 that immediately passes on flight deck commands to the ELT unit 30. This series configuration allows the EATD 32 to activate the ELT unit 30 either in response to flight deck inputs per the existing concept of operations or in response to The EATD's own trigger determination logic. Additionally, enhancements to reduce ELT false alarms can be implemented with EATD filtering of activation commands that are passed on to the ELT unit 30 (for example, by not passing on ELT activation commands when the aircraft is on the ground). Using this path allows the EATD 32 to apply advanced triggering capabilities to existing ELTs with no changes to the ELTs and very minor changes to the existing ELT wiring (and no ELT installation changes).

The parallel configuration shown in FIG. 3 and the series configuration shown in FIG. 4 both allow for significant improvements to the emergency location performance of the integrated systems. The EATD aircraft dynamics and state-based trigger functions are used to activate the fixed ELT unit 30 upon the detection of abnormal aircraft dynamics or states and prior to a crash.

The functionality provided by the EATD proposed herein addresses current ELT shortcomings and provides functionality for current ELT systems similar to some significant aspects of to the proposed second-generation ELTs. This EATD option potentially provides these benefits with fewer avionics updates and aircraft installation impacts and hence for less cost and at a potentially earlier time, supporting potentially earlier and larger airline uptake.

Figure 5:
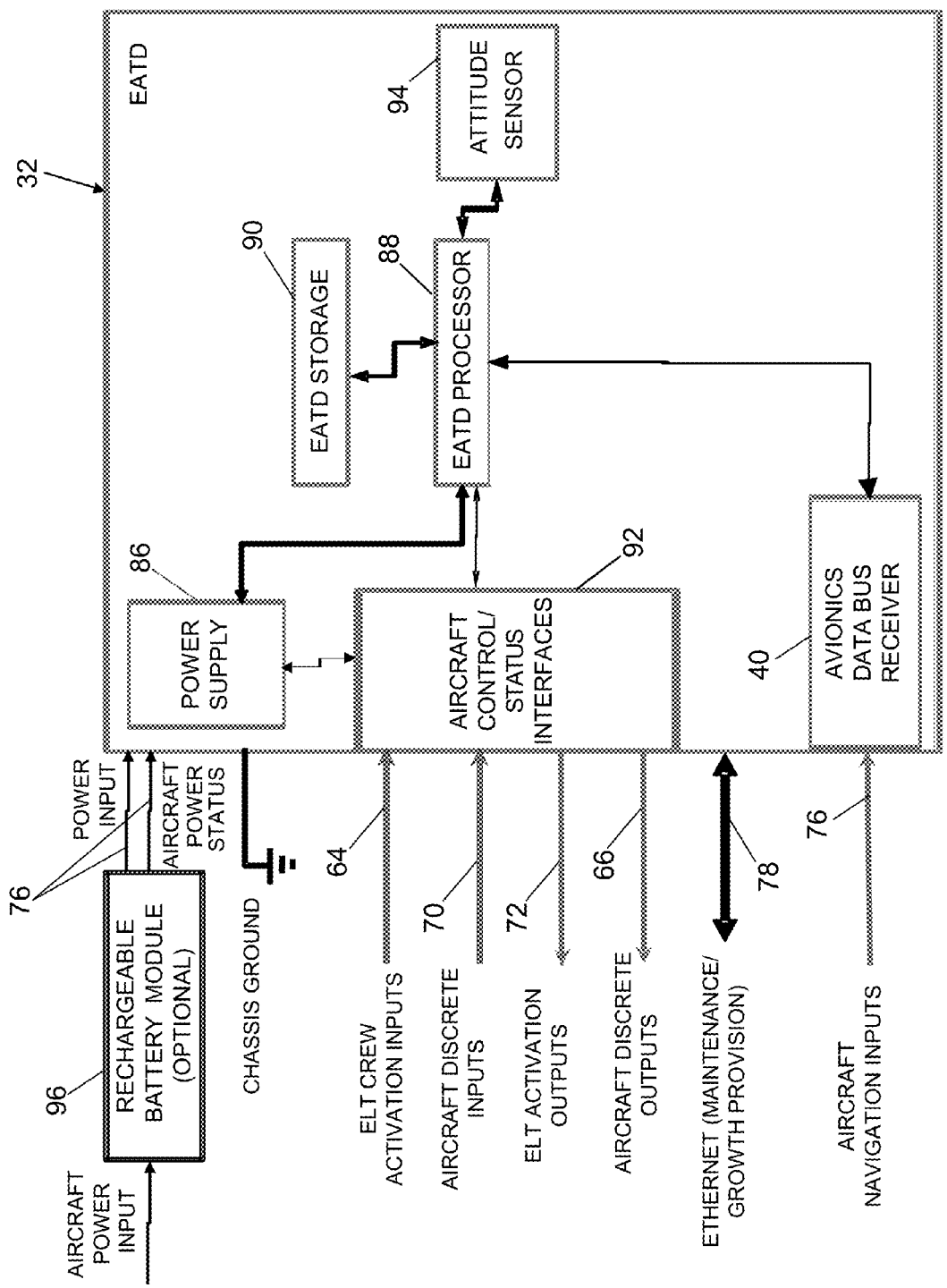
FIG. 5 is a block diagram identifying some components and interfaces of an EATD unit in accordance with one embodiment.

FIG. 5 is a block diagram identifying some components of an EATD 32 in accordance with one embodiment. The EATD 32 comprises an EATD processor 88 that communicates with EATD storage 90 (i.e., a non-transitory tangible computer-readable medium), aircraft control/status interfaces 92, an attitude sensor 94, and an avionics data bus receiver 40. The EATD 32 further comprises a power supply 86 that supplies electrical power to the EATD processor 88 and aircraft control/status interfaces 92. Optionally, the EATD 32 may be connected by aircraft power input 76 to a rechargeable battery module 96. This interface also provides indication of loss of aircraft power if the battery module is the direct power source.

As seen in FIG. 5, the aircraft control/status interfaces 92 receive ELT crew activation inputs 64 from the ELT deck remote panel 22 and aircraft discrete inputs from the aircraft avionics systems 28. In addition, the aircraft control/status interfaces 92 may send an EATD ON (distress) aircraft discrete output 66 to the aircraft avionics systems 28 and an ELT activation output 72 to the ELT unit 30 when a distressed state is detected.

The EATD processor 88 is programmed with navigation data functionality that takes digital aircraft navigation inputs 76 from the avionics data bus receiver 40, data from internal sensors (including attitude sensor 94) and data validity inputs and estimates and combines these per internal source prioritization logic or an input ground segment source command to provide high-quality estimates of aircraft location, speeds, track, attitudes and rates for use by other EATD functions.

An EATD interface architecture which addresses several key aspects of integrating EATDs and other potential devices with existing fixed ELT installations and their associated existing aircraft interfaces will now be described with reference to FIG. 6. This interface architecture provides the functions that interact with the ELT and aircraft interfaces in the multiple ways required to support the various integrated configurations described above and, of equal importance, it does so in a manner that is applicable across multiple aircraft models with different ELT flight deck controller types and ELTs from a range of different manufacturers (hence the "common" qualifier for these inputs). (As used herein, the term "common" means belonging to or shared by two or more components, not occurring or appearing frequently.)

Figure 6:
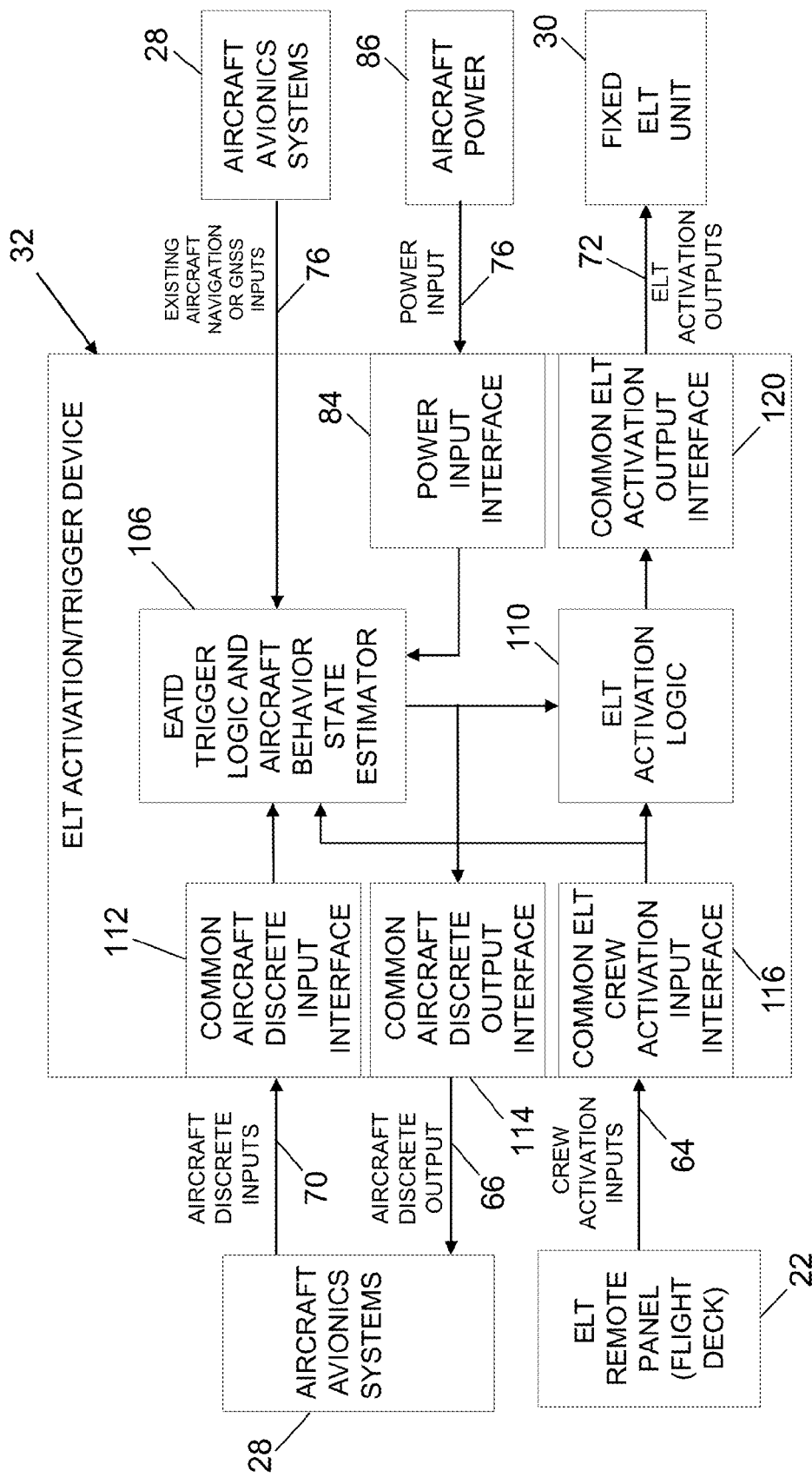
FIG. 6 is a diagram identifying EATD major functions and interfaces.

FIG. 6 is a diagram identifying major functions and interfaces of the EATD 32 which enable the configuration options described above. The major functions include EATD trigger logic and aircraft behavior state estimator 106 and ELT activation logic 110, which may comprise respective algorithms executed by a processor (e.g., a microprocessor). A second group of functions depicted in FIG. 6 are the EATD interface functions, including the following: a common aircraft discrete input interface 112; a common aircraft discrete output interface 114; a common ELT crew activation input interface 116; and a common ELT activation output interface 120. These interfaces include hardware and software, as will be described in detail below. The interface functions may be realized by executing respective interface algorithms, which interface algorithms may be executed by respective processors or a common processor. The operations of the EATD trigger logic and aircraft behavior state estimator 106, ELT activation logic 110 and input and output interfaces may all be performed by a single processor (e.g., a microprocessor). The EATD 32 further comprises a power input interface 84 which connects to the aircraft power system 86 to provide aircraft power inputs indicating the states of the aircraft engines.

The EATD trigger logic and aircraft behavior state estimator 106 receives aircraft navigation or GNSS inputs from the aircraft avionics systems 28 and discrete inputs from the common aircraft discrete input interface 112 and common ELT crew activation input interface 116. The EATD 32 applies trigger condition logic to estimate the distress/normal state of the aircraft. The estimate of the aircraft behavior state is used as an input to the ELT activation logic 110 and to provide outputs to the aircraft avionics systems 28 via the common aircraft discrete output interface 114.

The EATD trigger logic and aircraft behavior state estimator 106 integrates aircraft position and attitude data, aircraft state data, and aircraft discrete inputs to estimate the aircraft behavior state—typically normal, abnormal or distress. More specifically, the EATD 32 uses an autonomous aircraft behavior state estimator algorithm to internally generate triggers for activation of the ELT unit 30. The aircraft behavior estimate is based on the integration of four separate (but related) components or aspects of the observed aircraft state: the on-ground or airborne estimate, abnormal rates or attitudes for a given location as determined by dynamic trigger conditions, unusual altitudes for a given location and the loss of aircraft power inputs. The EATD 32 estimates aircraft behavior state using the internal GNSS (if included), internal attitude and rate sensor data or aircraft input navigation or GNSS data (if available) and aircraft power inputs. This function is described in more detail below with reference to FIG. 13.

The ELT activation logic 110 together with the common ELT activation output interface 120 enable implementation of the EATD-ELT configurations shown in FIGS. 3 and 4. This function takes inputs from the ELT crew activation input interface 116 and the EATD trigger logic and aircraft behavior state estimator 106 to determine whether to activate the ELT unit 30 via the common ELT activation output interface 120. The logic components of this function are described in more detail below with reference to FIG. 14.

In some cases the above-described EATD functions may have additional interfaces added or additional internal logic added or modified to support the capabilities needed to enable the various integrated EATD-ELT configurations.

The common aircraft discrete input interface 112 provides a generic and broadly applicable set of discrete inputs that are integrated into the EATD trigger logic. These discrete inputs can be sourced from existing aircraft avionics systems and, when combined with the appropriate logic in these avionics systems, can be used to include additional aircraft state information, for example, engine-out conditions, as components of the aircraft behavior estimator.

Figure 7:
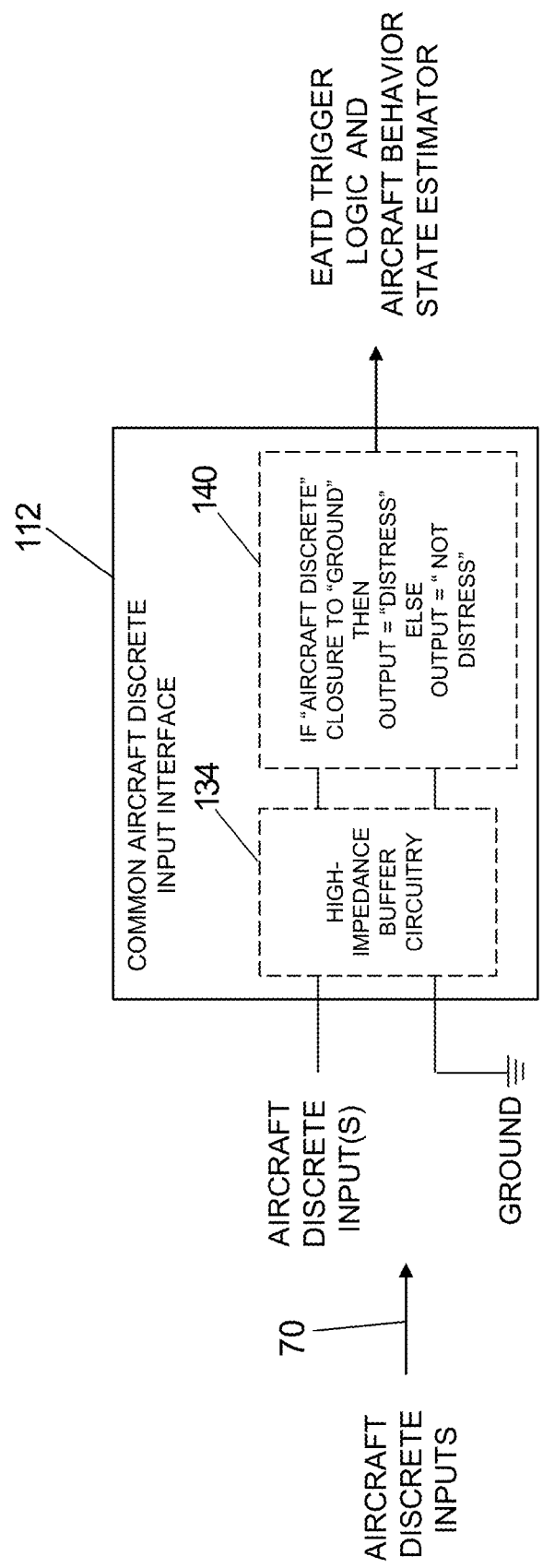
FIG. 7 is a diagram depicting functions that a common aircraft discrete input interface should include to support a broad range of aircraft avionics integration options.

FIG. 7 is a diagram depicting functions that the common aircraft discrete input interface 112 should include to support a broad range of aircraft avionics integration options. The common aircraft discrete input interface 112 provides a basic interface for use in integrating the EATD trigger functions with aircraft state inputs from the aircraft avionics systems 28 that may have different sources and implementations across different aircraft models and with different aircraft avionics architectures. The common aircraft discrete input interface 112 comprises a group of discrete-type inputs. These could be a single input but would typically support multiple separate inputs. Each input would be a typical aircraft discrete input. Each input is a single wire input which, combined with the EATD ground input, would support detecting an open or grounded state for the discrete input.

Figure 8C:
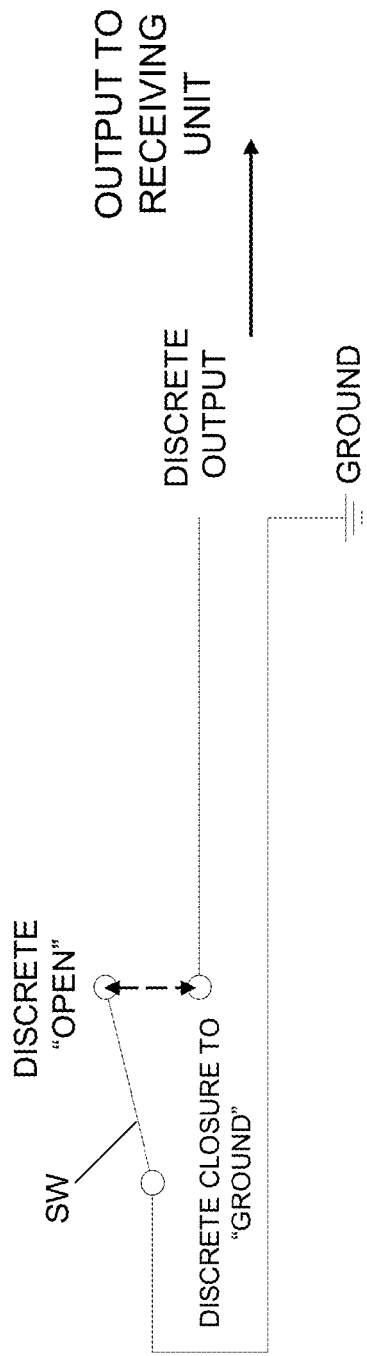
Figure 8D:
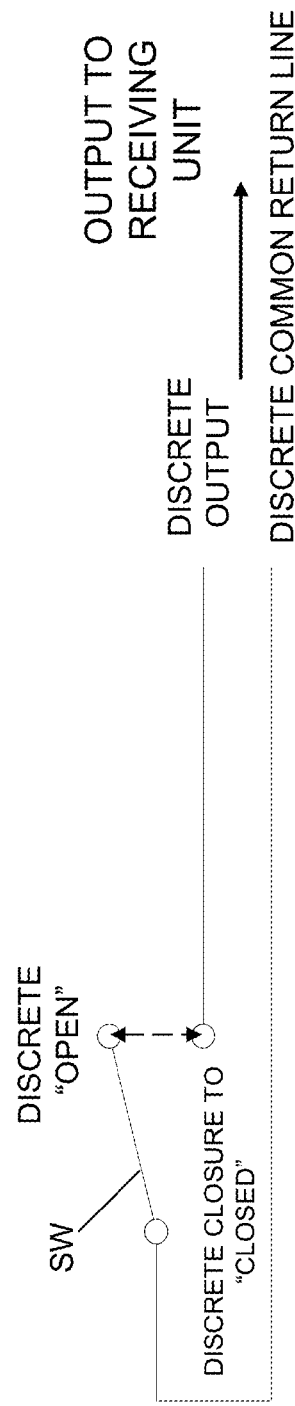

Discrete inputs and outputs are simple and environmentally robust means of sending signals between avionics units. Discrete data inputs and outputs use analog signals that are typically limited to two states, the equivalent of ON or OFF. These two states can be implemented by a high voltage level (typically 5 V or 28 V) versus a grounded (0 V) level or an open circuit (infinite impedance) versus a closed circuit (zero impedance). FIGS. 8A through 8D are diagrams showing different switch configurations for outputting different types of discretes: a 28-V discrete (FIG. 8A); a 5-V discrete (FIG. 8B); an Open/Ground discrete (FIG. 8C); and an Open/Closed discrete (FIG. 8D). (In FIGS. 8A-8D, "SW" indicates a switch and "R" indicates a resistor.) Using discretes to transmit signals is very limiting in the amount of data that can be transferred. These are typically used to signal the changing of relatively infrequent events, for example, an ELT activation. However, these are very robust signaling paths that are largely immune to noise and do not require closely synchronized system clocks.

Referring again to FIG. 7, the common aircraft discrete input interface 112 comprises high-impedance buffer circuitry 134 and common aircraft discrete input logic 140. The common aircraft discrete input interface 112 presents a high impedance so that the discrete inputs effectively draw no current. The open state for these inputs indicates either that the input is not activated or that the input is not present or used. The grounded state indicates that the input is active. These discretes are integrated into the EATD trigger logic and aircraft behavior state estimator function via a programmable input-to-aircraft state map. Table 1 shows typical values for a four-input example of an EATD discrete input mapping.

TABLE 1

| Discrete input | Aircraft Behavior Discrete Input State | |
|---|---|---|
| | Discrete Input Is Inactive | Discrete Input Is Active |
| Discrete input 1 | NORMAL | DISTRESS |
| Discrete input 2 | NORMAL | DISTRESS |
| Discrete input 3 | NORMAL | DISTRESS |
| Discrete input 4 | NORMAL | DISTRESS |

The aircraft behavior discrete input state map is implemented with default values (per the typical values shown above) and is updateable via EATD configuration file updates sent via a physical maintenance port update or over the air as a configuration update.

The EATD trigger logic and aircraft behavior state estimator 106 uses the aircraft behavior discrete input setting along with the other inputs (other aircraft state data, internal EATD sensor inputs etc.) to determine the estimated aircraft behavior state.

The common aircraft discrete input interface 112 provides a generic means to integrate diverse aircraft state inputs into the EATD trigger logic and hence into the integrated EATD-ELT functionality. This interface requires that an aircraft discrete and the associated discrete activation logic be present in an aircraft avionics system. The sourcing of this discrete and the implementation of the associated logic will vary based on the aircraft model and the associated avionics architecture.

There is also a significant amount of possible variation in the aircraft state information that this interface may be used to integrate into the EATD trigger logic. One possibility is the engine-out status for an aircraft. In this case, if no applicable discretes were available, then the aircraft avionics logic would be required to be implemented to drive available aircraft discrete outputs as inputs to the common aircraft discrete input interface 112.

The foregoing approach limits the by-aircraft model, by-avionics architecture and by-aircraft state input required variability to a single common interface. This interface is implemented with a generic, widely available set of physical inputs. The inputs from this interface are pre-integrated to the EATD trigger logic via an updateable, flexible mapping logic.

One alternative or complementary implementation of this interface could include other forms and polarities of discrete inputs (for example, a 5-V level is high/active and 0 V is low/inactive) to support a wider variety of potential discrete sources. Another alternative or complementary implementation of this interface could include avionics digital busses such as ARINC-429, ARINC-629 or ARINC-664/Ethernet inputs to provide the applicable aircraft state inputs in digital form.

The a common aircraft discrete output interface 114 provides a generic ELT ON-compatible discrete output that is integrated into the EATD trigger logic and can be integrated with various aircraft avionics systems 28 to provide output data on the triggering state of the EATD 32 to other aircraft systems.

Figure 9:
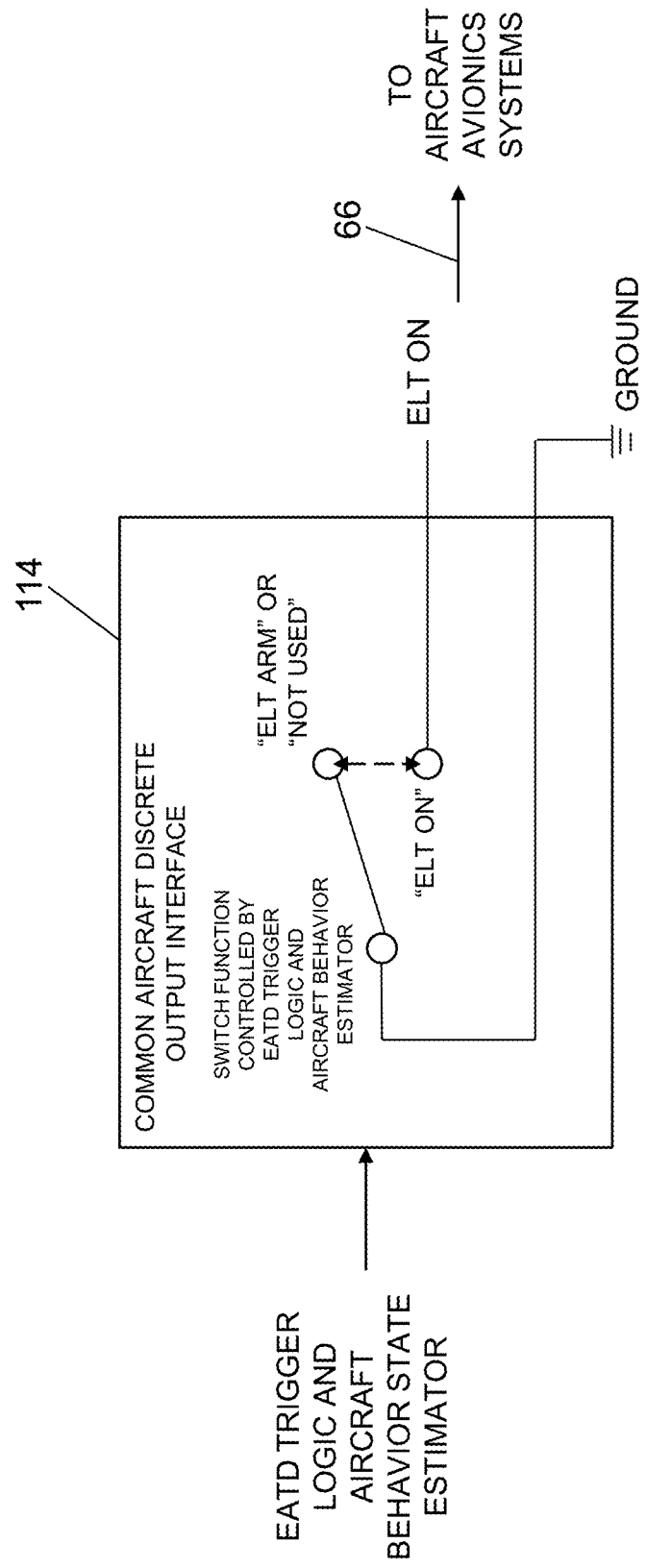
FIG. 9 is a diagram depicting functions that a common aircraft discrete output interface should include in order to support a broad range of aircraft avionics integration options.

FIG. 9 is a diagram depicting functions that a common aircraft discrete output interface 114 should include in order to support a broad range of aircraft avionics integration options. The switch function is controlled by the EATD trigger logic and aircraft behavior state estimator 106. The common aircraft discrete output interface 114 provides a means for annunciating entry into and exit from an aircraft distress state to connected aircraft avionics systems 28. This interface uses a discrete format that follows one commonly used by multiple models of ELTs. This output is a single-wire input which, combined with the EATD ground input, supports providing an open or grounded state for the discrete output. The common aircraft discrete output interface 114 presents a high impedance so that these inputs effectively draw no current.

The aircraft discrete output state is implemented with typical/default values as shown in Table 2 and is updateable via EATD configuration file updates sent via a physical maintenance port update or over the air as a configuration update. This common discrete output approach limits the by-aircraft model, by-avionics architecture and by-aircraft state input required variability by providing a single common interface. This interface is implemented with generic, widely available set of physical outputs that is compatible with the existing ELT ON outputs that are currently integrated with a number of aircraft systems. The outputs from this interface are pre-integrated with the EATD trigger logic via a flexible, updateable mapping logic that both supports an ELT-like annunciation concept of operations if needed or other uses if needed.

TABLE 2

| | Aircraft Discrete Output State | |
|---|---|---|
| | Discrete Input Is Inactive (Open) | Discrete Input Is Active (Grounded) |
| EATD Reporting State | NOT DISTRESS | DISTRESS |

An alternative or complementary implementation of this interface could include other forms and polarities of discrete inputs (for example, 5 V level is high/active and 0 V is low/inactive) to support a wider variety of potential discrete receivers in the aircraft avionics.

Another alternative or complementary implementation of this interface could include avionics digital bus-compatible output such as ARINC-429, ARINC-629 or ARINC-664/Ethernet inputs to provide the inputs to the applicable aircraft avionics in digital form.

Referring again to FIG. 6, the sequence of logical operations performed by the common ELT crew activation input interface 116, the ELT activation 110 and the common ELT activation output interface 120 provide the functionality that allows the EATD 32 to be inserted into and use the existing crew activation signal path from the ELT remote panel switch to the ELT unit 30.

The common ELT crew activation input interface 116 provides a generic ELT crew activation input function that is compatible with a wide variety of ELT remote panel switches and ELT configurations. This interface detects crew activation of the ELT system. The common ELT crew activation input interface 116 can be used in the previously described coupled EATD-ELT configurations shown in FIGS. 3 and 4. This interface provides the means for the EATD 32 to detect the flight deck activation of the ELT unit 30 using existing flight deck controllers (e.g., the ELT remote panel 22). The common ELT crew activation input interface 116 comprises a pair of switch configurations that can be supported by two signal wires and the EATD ground. The use of the input signals for these switch configurations is shown in Table 3.

TABLE 3

| | Switch Configuration 1 | | Switch Configuration 2 | |
|---|---|---|---|---|
| Input Signals | ELT ARM | ELT ON | ELT ARM | ELT ON |
| ELT External ON | Open | Grounded | Open | Shorted to ELT Common |

TABLE 3-continued

| | Switch Configuration 1 | | Switch Configuration 2 | |
|---|---|---|---|---|
| Input Signals | ELT ARM | ELT ON | ELT ARM | ELT ON |
| ELT Common | n/a | n/a | Open | Shorted to ELT External ON |
| EATD Ground | — | — | n/a | n/a |

FIGS. 10A and 10B depict the internal wiring of the flight deck panel switch in accordance with the respective ELT remote panel switch configurations listed in Table 3. The left side of these figures represents the functionality in the switches (i.e., external to the EATD). When the ELT remote panel switch is set to ARM (EXTERNAL ON signal is an open circuit), the EATD unit sets the Flight Crew Input State to ARM; when the ELT remote panel switch is set to ON (EXTERNAL ON signal is a grounded circuit), the EATD unit sets the flight crew input state to ON.

Figure 10C:
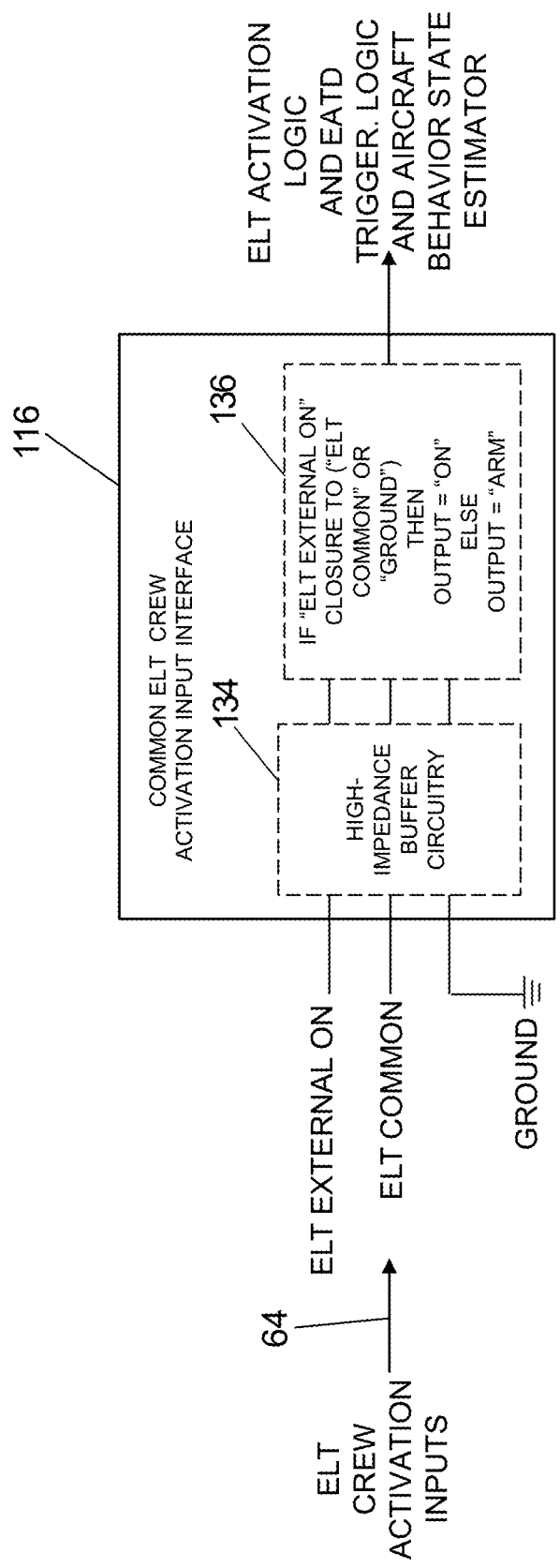
FIG. 10C is a diagram depicting a common ELT crew activation input interface function that allows EATD integration with either of the switch configurations shown in FIGS. 10A and 10B.

FIG. 10C depicts a common ELT crew activation input interface 116 that allows EATD integration with either of the switch configurations shown in FIGS. 10A and 10B. The common ELT crew activation input interface 116 comprises high-impedance buffer circuitry 134 and common ELT crew activation input logic 136. The common ELT crew activation input logic 136 ORs the two switch configurations together to determine the ELT ARM or ELT ON states. Thus the common ELT crew activation input interface 116 does not need to be pre-configured for a particular switch configuration. This input signal state-to-ELT crew activation state mapping is shown in Table 4, in which the "Input Signals" are from the ELT remote panel 22, and "ELT ARM" and "ELT ON" are the corresponding activation states output by the common ELT crew activation input interface 116 to the EATD trigger logic and aircraft behavior state estimator 106 (see FIG. 6).

The outputs from the high-impedance buffer circuitry 134 will be the same as the inputs to this buffer circuitry. This buffer circuitry ensures that the interface circuits do not draw significant current from the input circuits and are solely sensing the state of those inputs.

TABLE 4

| Signals Input to Common ELT Crew Activation Input Interface | States Output by Common ELT Crew Activation Input Interface | |
|---|---|---|
| | ELT ARM | ELT ON |
| ELT External ON | Open | Grounded OR Shorted to Common |
| ELT Common | Open | Open OR Shorted to External ON |

(1) For the case where a switch is used that references the ELT External ON line to the ELT COMMON line, the input to the buffer circuitry 134 and the output from the buffer circuitry 134 will be as follows:

(a) If the ELT switch is activated (switch in ON position); then "ELT External ON" to "ELT COMMON" impedance=zero (closed circuit) and "ELT External ON" to GROUND impedance=infinite (open circuit).

(b) If the ELT switch is not activated (switch in "ARM" position), then "ELT External ON" to "ELT COMMON" impedance=infinite (open circuit) and "ELT External ON" to GROUND impedance=infinite (open circuit).

(2) For the case where a switch is used that references the ELT EXTERNAL ON line to GROUND, the input to the buffer circuitry 134 and the output from the buffer circuitry 134 will be as follows:

(a) If the ELT switch is activated (switch in ON position), then "ELT External ON" to GROUND impedance=zero (closed circuit) and "ELT External ON" to "ELT COMMON" impedance=infinite (open circuit).

(b) if the ELT switch is not activated (switch in "ARM" position, then "ELT External ON" to GROUND impedance=infinite (open circuit) and "ELT External ON" to "ELT COMMON" impedance=infinite (open circuit).

The common ELT crew activation input logic 136 operates such that if it sees either "ELT External ON" to GROUND impedance=zero (closed circuit) OR "ELT External ON" to "ELT COMMON" impedance=zero (closed circuit) it considers the ON command to be active.

This activation portion of the interface thus detects the two primary ELT crew activation states of ARM (the ELT is not active but is ready to transmit upon internal or external activation input) and ON (the ELT has been activated and is broadcasting distress signals). Test/reset signals are not detected by this interface directly, but would be seen as a transient ON signal on the activation portion of the interface and can be inferred by the EATD. The mapping of the activation states output by the common ELT crew activation input interface 116 to the aircraft states estimated by the EATD trigger logic and aircraft behavior state estimator 106 (see FIG. 5) is shown in Table 5.

TABLE 5

| States Output by Common ELT Crew Activation Input Interface | Aircraft States Estimated by EATD Trigger Logic and Aircraft Behavior State Estimator |
|---|---|
| ELT ARM | NORMAL |
| ELT ON | DISTRESS |
| ELT ON Transient (ELT TEST) | ABNORMAL/TEST |

The ELT crew activation input state map is implemented with default values and is updateable via EATD configuration file updates sent via a physical maintenance port update.

To summarize the foregoing, the switch position is set by the crew using the ELT remote panel 22. The open/grounded configuration set by the switch position and the switch type are interpreted by the common ELT crew activation input interface 116 as either "ELT ARM" or "ELT ON", as described in Table 4. Then the output from the common ELT crew activation input interface 116, i.e., "ELT ARM", "ELT ON" or a transient "ELT ON", are mapped to various aircraft state estimates ("Normal", "Distress" or "Abnormal/Test") per Table 5 in the EATD trigger logic and aircraft behavior state estimator 106. The aircraft state estimates from these crew inputs are then combined with other aircraft state estimates in the EATD trigger logic and aircraft behavior state estimator 106.

This common ELT crew activation input approach allows the re-use of the existing ELT flight deck switch types and switches themselves (and much of the associated wiring) that is a key enabler for reduced costs. The reduction of the high by-aircraft and by-ELT switch complexity to a fairly simple common EATD interface is a significant benefit. The choice to only use the ELT activation portion of the interface reduces complexity and associated technical and certification risks.

The common ELT crew activation input interface 116 can be pre-integrated with the EATD trigger logic and aircraft behavior state estimator 106 via a flexible, updateable mapping logic that supports the use of the fight deck ELT activation switch as a high priority indication of aircraft distress state in the default configuration or supporting other prioritizations via changes in the mapping if required.

Referring again to FIG. 6, the common ELT activation output interface 120 provides a generic ELT activation output function that is compatible with a wide variety of ELT remote panel switch and ELT configurations. This interface activates the ELT unit 30 using the same switch output configurations as a corresponding crew activation of the ELT unit using the ELT remote panel 22. This mimicking of crew activation allows the EATD 32 to activate an ELT unit 30 without any new ELT interfaces or any changes to the existing ELTs.

The common ELT activation output interface 120 is a component used in the EATD-ELT configurations shown in FIGS. 3 and 4. This interface provides the means for the EATD 32 to control the activation of the ELT unit 30 using existing ELT control inputs. This interface uses the same approach (building on the same data) as described with reference to the common ELT crew activation input interface 116 to provide ELT activation outputs applicable for a wide range of ELT types and aircraft installation configurations.

The common ELT activation output interface 120 provides two signal outputs (and the associated EATD ground) that support the two switch configurations previously identified as providing a broadly applicable ELT activation interface. These output signals are high-impedance Open/Grounded discrete signals that provide the functionality of the two switch configurations shown in FIGS. 11A and 11B. The output signals are configured as shown in Table 6 based on the command from the ELT activation logic 110 (see FIG. 6) for the ELT ARM or ELT ON state.

TABLE 6

| EATD Output | Switch Configuration 1 | | Switch Configuration 2 | |
|---|---|---|---|---|
| Signals | ELT ARM | ELT ON | ELT ARM | ELT ON |
| ELT External ON | Open | Grounded | Open | Shorted to Common |
| ELT Common | n/a | n/a | Open | Shorted to External ON |
| EATD Ground | — | — | n/a | n/a |

Figure 11C:
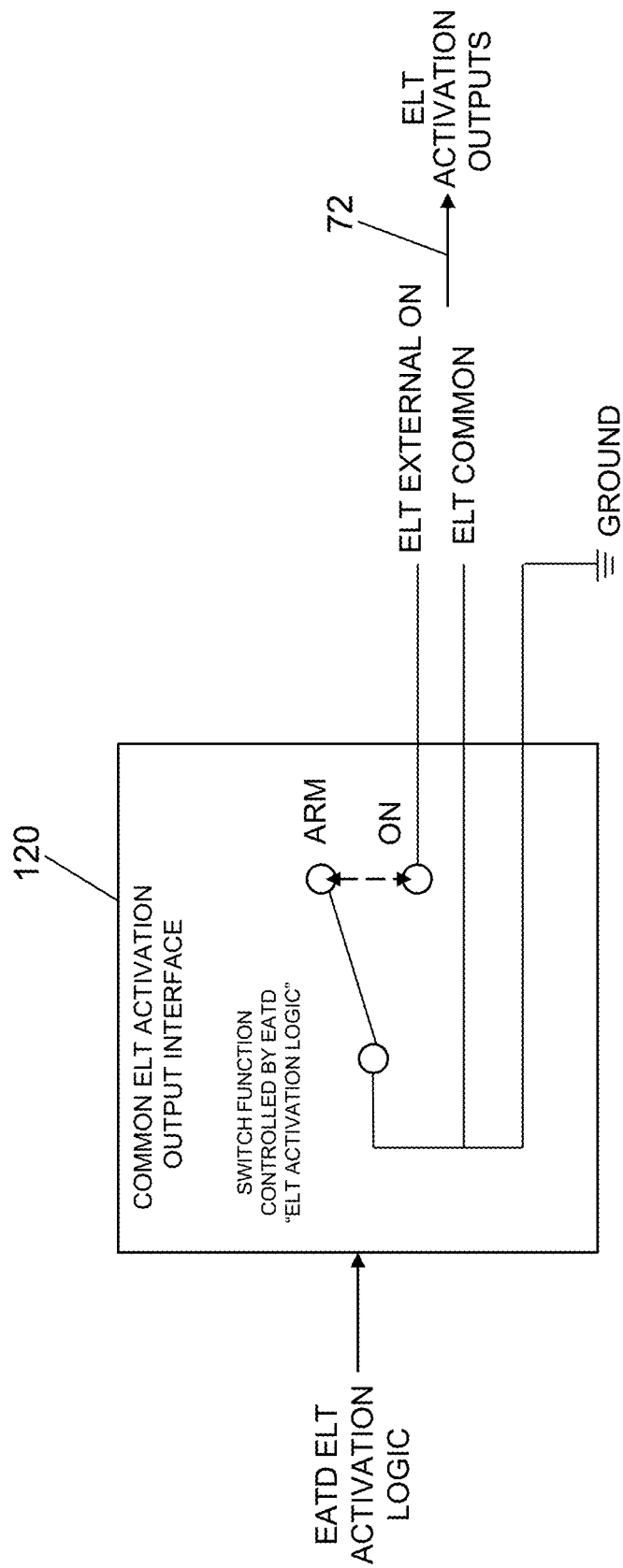
FIG. 11C is a diagram depicting a common ELT activation output interface function that allows EATD integration with ELT units having either of the activation configurations shown in FIGS. 11A and 11B.

For a given ELT type/installation configuration, the associated switch configurations shown in FIGS. 11A and 11B respectively can be inferred from the signal configurations seen on the common ELT crew activation input or would be entered as a configuration data entry (updateable over the air or via the maintenance port). Both switch configurations shown in FIGS. 11A and 11B use the ELT External ON Signal. If the ELT Common signal is not used for a given configuration, then this would not have to be connected. As seen in FIG. 11C, the common ELT activation output interface 120 comprises a configuration that emulates both of the remote switch configurations depicted in FIGS. 11A and 11B. The switch function is controlled by the ELT activation logic 110.

More specifically, the EATD pass-through function uses the output configuration that is equivalent to the received crew activation inputs. The EATD sets the pass-through function outputs to ARM by setting the ELT EXTERNAL ON signal to an open circuit with respect to ground and with respect to the ELT COMMON signal. The EATD sets the pass-through function output to ON by setting the ELT EXTERNAL ON signal to a closed circuit with respect to ground or with respect to the ELT COMMON signal following on the crew activation input configuration. When the ELT control panel switch is set to ARM, the EATD sets the pass-through function outputs to ARM within a short period of time (e.g., 0.1 second). When the ELT control panel switch is set to ON, the EATD sets the pass-through function outputs to ON within the same short period of time.

The common ELT activation output state map is implemented with default values and is updateable via EATD configuration file updates sent via a physical maintenance port update or over the air as a configuration update.

Figure 12:
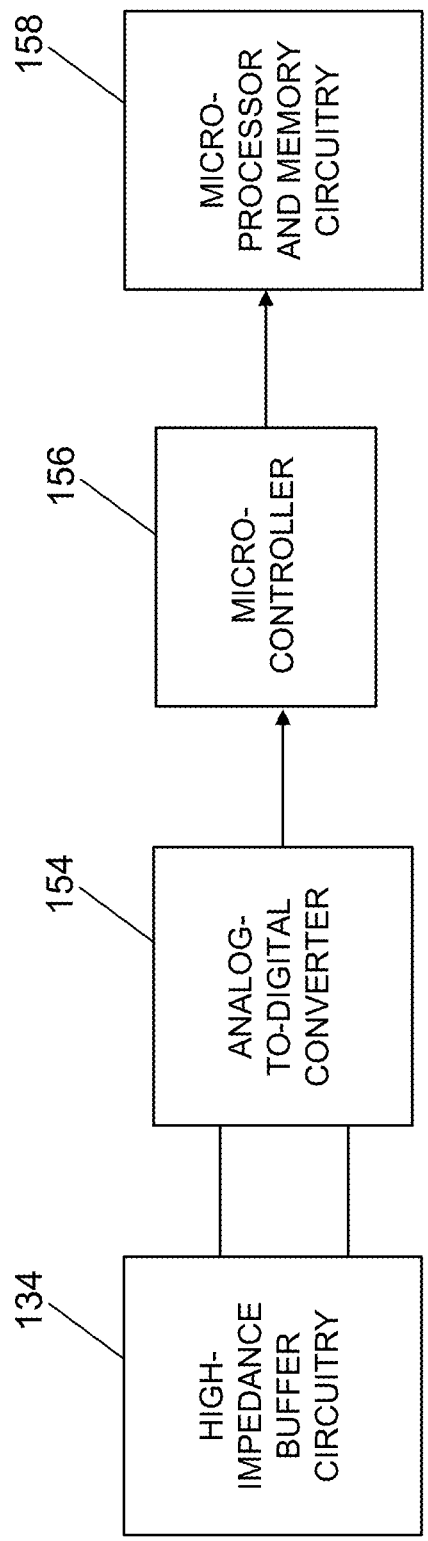
FIG. 12 is a block diagram showing some hardware components of the EATD, including interface circuitry and a microprocessor that executes one or both of the interface sensor functions identified in FIGS. 9C and 10C.

FIG. 12 shows electronic circuitry incorporated in the EATD and configured to perform the interfacing and other functions disclosed herein in accordance with some embodiments. This electronic circuitry includes the high-impedance buffer circuitry 134, an analog-to-digital converter 154 (e.g., a discrete-to-digital converter), a microcontroller 156, and a microprocessor 158, connected in series. The microprocessor 158 can be programmed to execute one or both of the interface sensor functions identified in FIGS. 7 and 10C. The electronic circuitry depicted in FIG. 12 may be common to the common aircraft discrete input interface 112 and the common ELT crew activation input interface 116. In the alternative, the individual interfaces may each incorporate the electronic circuitry depicted in FIG. 12.

Optionally, the buffer circuitry 134 may be incorporated in the analog-to-digital converter 154. The analog-to-digital converter 154 may be a separate integrated circuit or a built-in discrete input on the microcontroller 156. The analog-to-digital converter 154 converts the analog discrete inputs into digital inputs to the microcontroller 156. The microcontroller 156 aggregates various inputs and puts them on a digital bus for input to the microprocessor 158, where the logic would be implemented as a software function. Optionally, the microcontroller functionality may be in the microprocessor 158. Other software functions, such as the ELT activation logic 110 and the EATD trigger logic and aircraft behavior estimator 106, may be on the same microprocessor hardware platform as the above-described sensor functions 136 and 140.

Furthermore, the common aircraft discrete output interface 114 may comprise a variation of the electronic circuitry depicted in FIG. 12. The electronic circuitry in this case would include the same microcontroller 156 and microprocessor 158, but instead of an analog-to-digital converter 154 between the microcontroller 156 and the high-impedance buffer circuitry 134, the electronic circuitry would include any one of the following integrated circuits: a digital-to-analog converter, a digital-to-discrete converter, discrete switching or a discrete driver output. The microprocessor 158 would feed the microcontroller 156 to control the output discrete states via the common driver/out integrated circuit.

Figure 13:
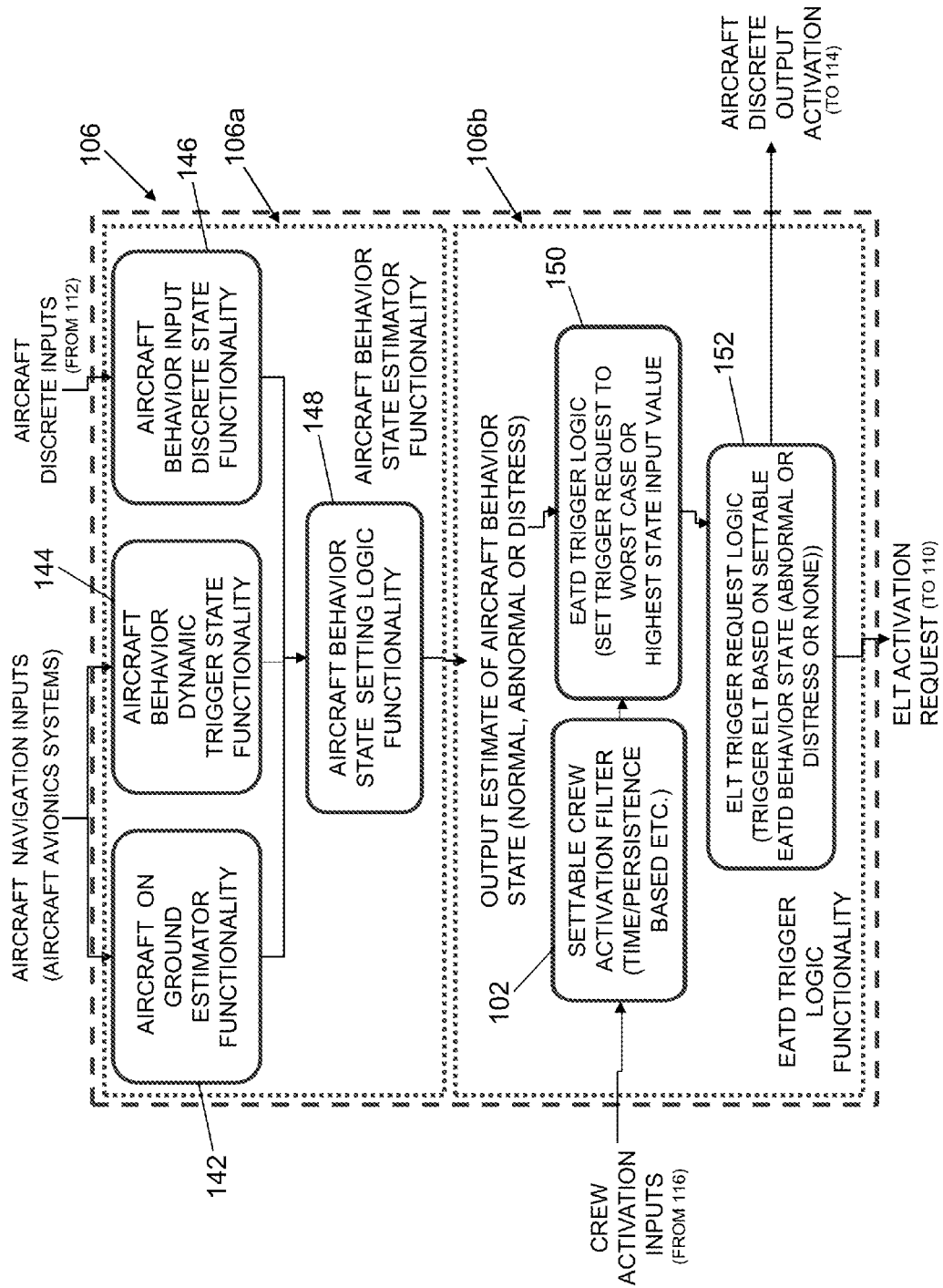
FIG. 13 is a diagram identifying components of the EATD trigger logic and aircraft behavior state estimator in accordance with one embodiment of the EATD.

FIG. 13 is a diagram identifying components of the EATD trigger logic and aircraft behavior state estimator 106 in accordance with one embodiment of the EATD 32. The EATD processor 88 (see FIG. 5) uses an autonomous algorithm, referred to herein as the aircraft behavior state estimator 106a, to internally generate triggers for activating the ELT unit 30. This is the logic that allows early detection of an aircraft in distress and hence the early triggering and longer duration broadcasts that provide improved emergency detection benefits. The aircraft behavior state estimator 106a comprises an aircraft-on-ground estimator 142 and aircraft behavior dynamic trigger state functionality 144, both of which receive aircraft navigation or GNSS inputs from the aircraft avionics systems 28. The aircraft behavior state estimator 106a depicted in FIG. 13 further comprises aircraft behavior input discrete state functionality 146, which receives aircraft discrete inputs from the aircraft avionics system 28 by way of the common aircraft discrete input interface 112 (see FIG. 6).

FIG. 13 shows the logic flow for the aircraft behavior state estimator 106a. The aircraft behavior estimate is based on the integration of several components or aspects of the observed aircraft state: the on-ground or airborne estimate, abnormal rates or attitudes for a given location as determined by dynamic trigger conditions, and the state of aircraft discrete inputs from the aircraft avionics systems. The on-ground or airborne state of the aircraft is estimated by the aircraft-on-ground estimator 142; the abnormal rates or attitudes are determined by the aircraft behavior dynamic trigger state functionality 144; and the state of aircraft discrete inputs is determined by the aircraft behavior input discrete state functionality 146. The results are input to the aircraft behavior state setting logic functionality 148, which outputs signals indicating the estimated state of the aircraft. The possible states include: normal, abnormal and distress (or pre-crash) behavior. The aircraft behavior state estimator 106a also outputs whether the aircraft is airborne or on-the-ground (landed).

The aircraft-on-ground estimator 142 uses aircraft speed and altitude to estimate whether the aircraft is on the ground (e.g., landed) or in the air. The aircraft behavior state setting logic 148 is configured to suppress the dynamic trigger conditions (from aircraft behavior dynamic trigger state functionality 144) and aircraft discrete inputs (from aircraft behavior input discrete state functionality 146) for setting aircraft behavior estimate abnormal or distress states if the output from aircraft-on-ground estimator 142 indicates that the aircraft is on the ground. The aircraft behavior state setting logic 148 is also configured to output a signal indicating that the estimated aircraft behavior state is abnormal or distress depending on the state of aircraft discrete inputs output by the aircraft behavior input discrete state functionality 146. The aircraft behavior state setting logic 148 is further configured to output a signal indicating that the estimated aircraft behavior state is abnormal or distress depending on whether the aircraft behavior dynamic trigger state functionality 144 has detected an abnormal attitude, speed or altitude.

The aircraft behavior dynamic trigger state functionality 144 uses logic that compares sensor data to trigger conditions that may indicate an abnormal or distress state, such as unusual attitude (e.g., excessive bank or pitch), unusual speed (e.g., horizontal speed outside a range or excessive vertical speed), an unusual altitude (e.g., an altitude outside of an expected range, and an unusual maneuver (e.g., an excessive track change). Tables setting forth trigger conditions in accordance with one configuration can be found in FIGS. 11 through 15 in U.S. patent application Ser. No. 14/858,235, the disclosure of which is incorporated by reference herein in its entirety. Other tables to set normal, abnormal or distress state conditions while the aircraft is in an airborne state can be used. Geofences, or geographic boundaries, may be defined to define oceanic or remote versus continental or non-remote airspace where greater radar and surveillance coverage will be available to help locate an aircraft in distress. For example, the geofences may provide different minimum and maximum altitude thresholds for oceanic or en route flight phases and for flight phases occurring closer to the origination and destination locations.

The aircraft behavior state setting logic 148 has state settings of NORMAL, ABNORMAL and DISTRESS. The logic for setting these states is as follows:

(a) The ADT unit sets the aircraft behavior state to NORMAL when the aircraft is on the ground.

(b) When the aircraft is airborne, the ADT unit sets the aircraft behavior state to the highest values specified by:

(1) an aircraft behavior dynamic trigger state setting determined by the aircraft behavior dynamic trigger state logic 144 (the aircraft behavior state is set to the highest values specified by trigger condition logic of the types indicated in FIGS. 11-15 of U.S. patent application Ser. No. 14/858,235);

(2) a minimum/maximum safe altitude state setting as determined by maximum/minimum safe altitude logic;

(3) an aircraft behavior power state setting as determined by aircraft behavior power state transitions logic;

(4) an aircraft behavior ELT state setting as determined by aircraft behavior ELT state transitions logic;

(5) an aircraft discrete input state setting as determined by aircraft behavior discrete input state transitions logic; and.

(6) Treat any BEHAVIOR INDETERMINATE setting inputs as ABNORMAL state settings and report the presence of BEHAVIOR INDETERMINATE settings.

The EATD unit uses the following hierarchy for determining the relative values of the requested Airborne Behavior State: DISTRESS>ABNORMAL>NORMAL (i.e., DISTRESS is the highest aircraft behavior state, NORMAL is the lowest.)

Still referring to FIG. 13, the aircraft behavior state estimator 106a outputs its estimate of the aircraft behavior state to the EATD trigger logic 106b. The EATD trigger logic 106b comprises EATD trigger logic 150 and ELT activation request logic 152. The EATD trigger logic 150 first determines the transmit state (whether the EATD is allowed to transmit or not) currently active. Then, if the Transmit-ON state is active (i.e., transmissions are allowed), the EATD trigger logic 150 determines the appropriate value of a activation request based on a worst case input. The EATD trigger logic 150 determines the current transmit state (Transmit ON or Transmit OFF) using filtered flight crew activation inputs received from a settable crew activation filter 102. The settable crew activation filter 102 filters flight crew activation inputs 116 received from the common ELT crew activation input interface 116 (see FIG. 6) based on time/persistence or other factor. Based on these inputs, the EATD trigger logic 150 outputs to the ELT activation request logic 152 the appropriate value of the activation request based on a worst case. The ELT activation request logic 152 is configured to output the ELT activation request to the ELT activation logic 110 (see FIG. 6) based on a settable EATD behavior state (Abnormal or Distress or Normal). The ELT activation request logic 152 also sends a discrete output indicating ELT activation to the common aircraft discrete output interface 114 (see FIG. 6).

Typically, the ELT activation request is sent whenever a distress state is recognized. Whether the EATD trigger logic 106b sends an ELT activation request to the ELT activation logic 110 under abnormal conditions or not will depend on how the EATD trigger logic 106b is configured by the user. If the EATD trigger logic and aircraft behavior state estimator 106 detects an abnormal condition, then an ELT activation signal may be sent to the ELT activation logic 110 depending on whether abnormal states are configured to activate the ELT unit 30. An alternate implementation is to require the abnormal condition to be active for a longer time before the ELT unit 30 is activated. This abnormal state estimate provides estimates that are not as indicative of a true distress condition but are indicative of abnormal conditions. These abnormal conditions may result in more false positive ELT activations, but may also result in earlier activations in the case of an aircraft in distress. Thus it is envisioned as a configurable state that can be updated based on operational experience.

Figure 14:
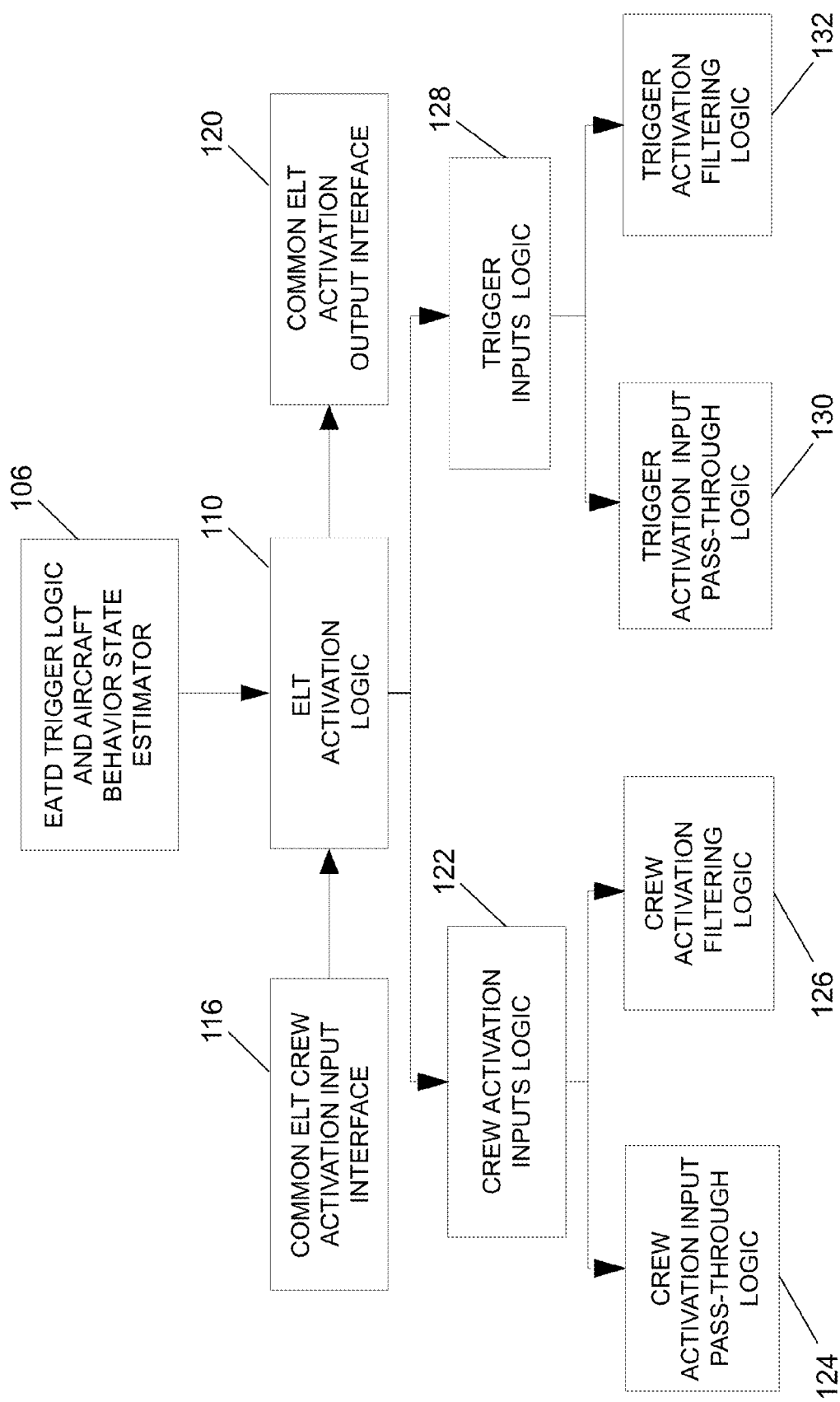
FIG. 14 is a block diagram identifying components of an ELT activation logic function for an EATD.

For the coupled EATD-ELT configurations depicted in FIGS. 3 and 4, the ELT activation logic 110 provides the bridge between the incoming ELT crew activation inputs, the EATD trigger logic and aircraft behavior state estimator 106 and the output ELT activation signals that provide the external activation commands to the ELT unit 30. The basic components of the ELT activation logic 110 are shown in FIG. 14.

At the top level the ELT activation logic 110 may comprise two separate software modules: crew activation inputs logic 122 and trigger inputs logic 128, respectively corresponding to the two potential sources of ELT activation inputs: the flight crew activation inputs coming in via the common ELT crew activation input interface 116 and the EATD activation inputs coming in via the EATD trigger logic and aircraft behavior state estimator 106 (which inputs include aircraft discrete inputs from the avionics system 28).

The crew activation inputs logic 122 in turn comprises two components (e.g., computer routines for executing respective algorithms): crew activation input pass-through logic 124 and crew activation filtering logic 126. The basic crew activation input pass-through logic 124 is designed to apply the current crew activation input state (e.g., ELT ON or ELT ARM) to the common ELT activation output interface 120 within a short period of time (on the order of 0.1 second), subject to the crew activation filtering logic 126. The basic crew activation filtering logic 126 is designed to allow all crew activations to pass through to the common ELT activation output interface 120 while the aircraft is airborne and while there is no countermanding ground segment command. Other flight crew activation filters can be applied and this function is implemented with default values and is updateable via EATD configuration file updates sent via a physical maintenance port update or over the air as a configuration update.

Similarly, the trigger inputs logic 128 in turn comprises two components (e.g., computer routines for executing respective algorithms): the trigger activation input pass-through logic 130 and the trigger activation filtering logic 132. The basic trigger activation input pass-through logic 130 is designed to apply any aircraft behavior state of distress as an ELT ON state and any other states as maintaining ELT ARM to the common ELT activation output interface 120 within a short period of time (on the order of 0.1 second), subject to the trigger activation filtering logic 132. The basic trigger activation filtering logic 132 is designed to allow all ELT activations to pass through to the common ELT activation output interface 120 while the aircraft is airborne. Other trigger activation filters can be applied and this function is implemented with default values and is updateable via EATD configuration file updates sent via a physical maintenance port update.

For conflicting or differing flight crew and trigger input values, the highest priority goes to the input with the greatest severity level, i.e., an input of ELT ON supersedes an input of ELT ARM.

Figure 15:
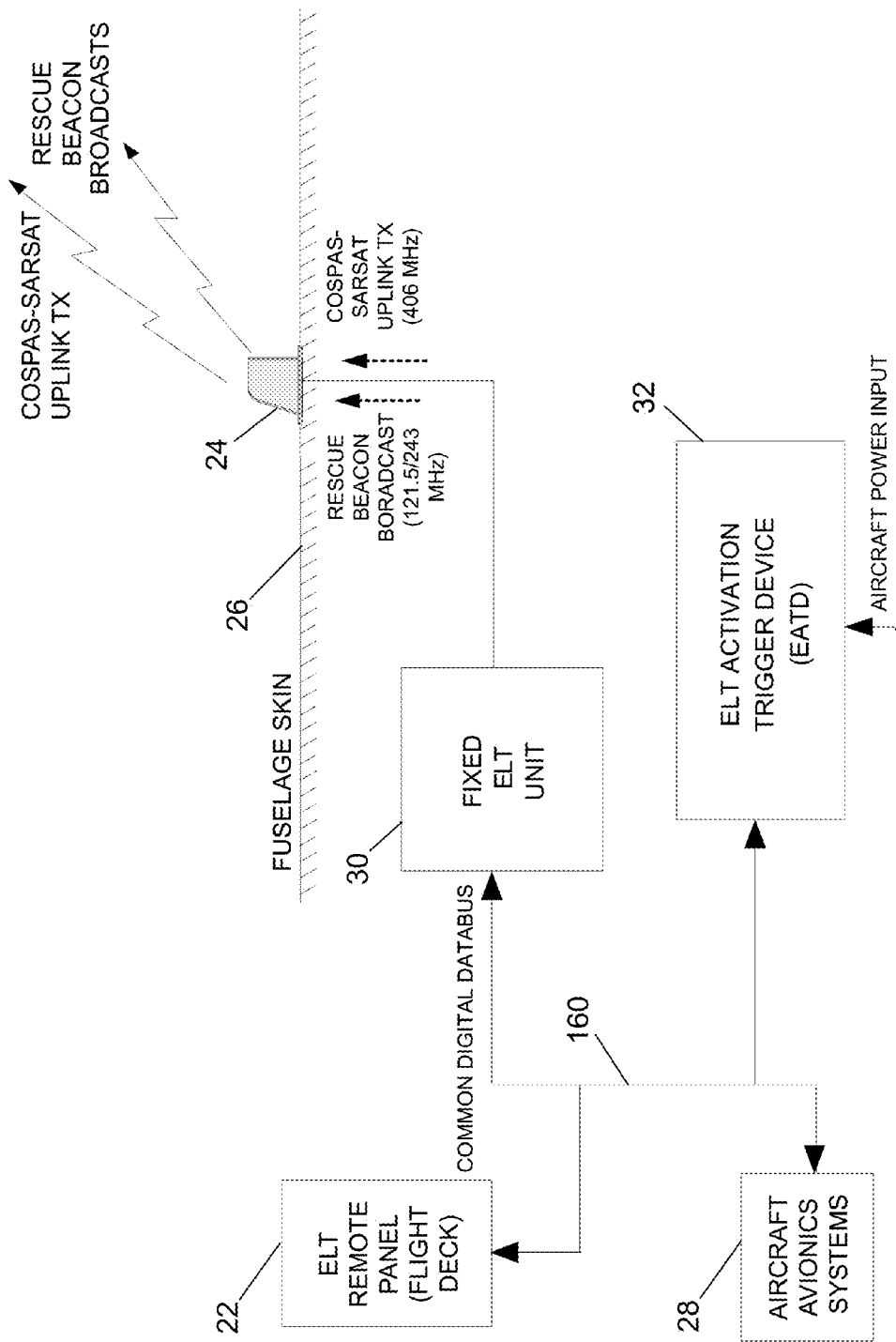
FIG. 15 is a diagram showing an EATD-ELT architecture in accordance with an alternative embodiment in which the various control data interconnections are implemented as a common digital data bus.

In accordance with alternative embodiments, the various control data interconnections could be implemented as a common digital data bus instead of multiple aircraft discrete inputs and outputs. This would entail data being sent on the common data bus and would significantly increase the opportunity for data sharing and coordination between the units. FIG. 15 shows one example of an EATD-ELT architecture with common use of an ELT flight deck control panel configuration in which the various control data interconnections are implemented as a common digital data bus 160. This common digital data bus architecture can be used to implement either a parallel or a series EATD-ELT configuration.

While apparatus and methods have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The process claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. A system onboard an aircraft comprising:
   an ELT remote panel on the flight deck of the aircraft, the ELT remote panel comprising a switch;
   an antenna that is attached to an exterior of a fuselage skin of the aircraft;
   an emergency locator transmitter connected to the antenna; and
   an activation/trigger device connected to the switch of the ELT remote panel and to the emergency locator transmitter,
   wherein the emergency locator transmitter is also connected to the switch of the ELT remote panel;
   wherein the activation/trigger device comprises a common ELT crew activation input interface, ELT activation logic configured to process inputs received from the common ELT crew activation input interface, and a common ELT crew activation output interface comprising first, second and third terminals and a switch;
   wherein the first terminal of the common ELT crew activation output interface is connected to the emergency locator transmitter and the third terminal of the common ELT crew activation output interface is connected to ground;
   wherein the switch has an input terminal connected to the second and third terminals, an ARM terminal and an ON terminal connected to the first terminal, the switch being switchable between a first switch state wherein the input terminal is electrically connected to the ARM terminal and a second state wherein the ON terminal is electrically connected to the input terminal; and
   wherein the state of the switch is controlled by the ELT activation logic.

2. The system as recited in claim 1, further comprising an aircraft avionics system connected to the activation/trigger device.

3. The system as recited in claim 2, wherein the ELT activation logic is further configured to determine, based on inputs from aircraft avionics systems and ELT crew activation inputs from the switch of the ELT remote panel, whether an ELT activation signal should be sent to the emergency locator transmitter or not.

4. The system as recited in claim 3, wherein the inputs from the output data port of the aircraft avionics system comprise aircraft discrete inputs.

5. The system as recited in claim 3, wherein the inputs from the output data port of the aircraft avionics system comprise aircraft navigation inputs.

6. The system as recited in claim 1, wherein the first terminal is connected to an ELT External On line and the second terminal is connected to an ELT Common line.

7. The system as recited in claim 1, wherein the common ELT crew activation input interface comprises fourth, fifth and sixth terminals and a processor configured to output an ELT ON state signal to the ELT activation logic if an impedance between the fourth and sixth terminals is effectively zero or if an impedance between the fourth and fifth terminals is effectively zero.

8. A system onboard an aircraft comprising:
a manually operable switch incorporated in an ELT remote panel;
an antenna that is attached to an exterior of a fuselage skin of the aircraft;
an emergency locator transmitter having a radio frequency signal port connected to the antenna; and
an activation/trigger device connected to the switch of the ELT remote panel by wiring and connected to the emergency locator transmitter by wiring,
wherein the emergency locator transmitter is also connected to the switch of the ELT remote panel by wiring;
wherein the activation/trigger device comprises a common ELT crew activation input interface, ELT activation logic configured to process inputs received from the common ELT crew activation input interface, and a common ELT crew activation output interface comprising first, second and third terminals and a switch;
wherein the first terminal of the common ELT crew activation output interface is connected to the emergency locator transmitter and the third terminal of the common ELT crew activation output interface is connected to ground;
wherein the switch has an input terminal connected to the second and third terminals, an ARM terminal and an ON terminal connected to the first terminal, the switch being switchable between a first switch state wherein the input terminal is electrically connected to the ARM terminal and a second state wherein the ON terminal is electrically connected to the input terminal; and
wherein the state of the switch is controlled by the ELT activation logic.

9. The system as recited in claim 8, further comprising an aircraft avionics system connected to the activation/trigger device.

10. The system as recited in claim 9, wherein the ELT activation logic is further configured to determine, based on inputs from aircraft avionics systems and ELT crew activation inputs from the switch of the ELT remote panel, whether an ELT activation signal should be sent to the emergency locator transmitter or not.

11. The system as recited in claim 8, wherein the first terminal is connected to an ELT External On line and the second terminal is connected to an ELT Common line.

12. The system as recited in claim 8, wherein the common ELT crew activation input interface comprises fourth, fifth and sixth terminals and a processor configured to output an ELT ON state signal to the ELT activation logic if an impedance between the fourth and sixth terminals is effectively zero or if an impedance between the fourth and fifth terminals is effectively zero.

13. An emergency locator transmitter (ELT) activation/trigger device comprising:
first processing means comprising ELT activation logic; and
an input interface comprising first, second and third terminals and second processing means configured to output an ELT ON state signal to the ELT activation logic if an impedance between the first and third terminals is effectively zero or if an impedance between the first and second terminals is effectively zero.

14. The ELT activation/trigger device as recited in claim 13, wherein the input interface further comprises:
a high-impedance buffer circuit connected to the first, second and third terminals; and
an analog-to-digital converter between the high-impedance buffer circuit and the second processing means.

15. The ELT activation/trigger device as recited in claim 13, wherein the first processing means further comprises an aircraft behavior state estimator and trigger logic that receives an estimated aircraft behavior state signal from the aircraft behavior state estimator and the ELT ON state signal from the second processing means, and is configured to send an ELT activation request signal to the ELT activation logic if the estimated aircraft behavior state signal indicates an abnormal or distress state or an ELT ON state signal has been received.

16. The ELT activation/trigger device as recited in claim 13, further comprising an output interface comprising fourth, fifth and sixth terminals and a switch, wherein the switch has an input terminal connected to the fifth and sixth terminals, an ARM terminal, and an ON terminal connected to the fourth terminal, the switch being switchable between a first switch state wherein the input terminal is electrically connected to the ARM terminal and a second state wherein the ON terminal is electrically connected to the input terminal, the state of the switch being controlled by the ELT activation logic.

* * * * *